(12) United States Patent
Ohgi

(10) Patent No.: US 7,506,348 B2
(45) Date of Patent: Mar. 17, 2009

(54) DISC CARTRIDGE, AND DISC RECORDING AND/OR REPRODUCING DEVICE USING THE SAME

(75) Inventor: Takashi Ohgi, Miyagi (JP)

(73) Assignee: Sony Corporation, Tokyo (JP)

( * ) Notice: Subject to any disclaimer, the term of this patent is extended or adjusted under 35 U.S.C. 154(b) by 315 days.

(21) Appl. No.: 10/556,809

(22) PCT Filed: Apr. 7, 2005

(86) PCT No.: PCT/JP2005/006867

§ 371 (c)(1),
(2), (4) Date: Nov. 15, 2005

(87) PCT Pub. No.: WO2005/098857

PCT Pub. Date: Oct. 20, 2005

(65) Prior Publication Data

US 2006/0291099 A1 Dec. 28, 2006

(30) Foreign Application Priority Data

Apr. 8, 2004 (JP) .............................. 2004-114593
May 10, 2004 (JP) .............................. 2004-140474

(51) Int. Cl.
*G11B 23/03* (2006.01)
(52) U.S. Cl. ..................... 720/740; 360/133
(58) Field of Classification Search ......... 720/738–744; 360/133
See application file for complete search history.

(56) References Cited

U.S. PATENT DOCUMENTS

2003/0235144 A1 * 12/2003 Eum et al. .................. 369/291

2005/0160445 A1 7/2005 Ohgi

FOREIGN PATENT DOCUMENTS

| EP | 0218231 | 4/1987 |
|---|---|---|
| JP | 1998-72777 | 5/1988 |
| JP | 07153222 A * | 6/1995 |
| JP | 08315537 A * | 11/1996 |
| JP | 2001-160275 | 6/2001 |
| JP | 2002074886 A * | 3/2002 |
| JP | 2002216450 A * | 8/2002 |
| JP | 2003-257148 | 9/2003 |

OTHER PUBLICATIONS

U.S. Appl. No. 10/541,456, filed Jul. 6, 2005, Ohgi et al.

* cited by examiner

*Primary Examiner*—William J Klimowicz
(74) *Attorney, Agent, or Firm*—Oblon, Spivak, McClelland, Maier & Neustadt, P.C.

(57) ABSTRACT

A disk cartridge is provided that has an optical disk (2) encased therein. It includes a cartridge body (5) having formed therein a head opening (13) through which a part of the disk, ranging from the inner to outer radius, is exposed to outside, a shutter member (21) including a shutter (22) that covers and uncovers the head opening and installed to the cartridge body to be movable between a position to cover the head opening and a position to uncover the head opening, and shutter movement limiter (41) provided on an elastic moving piece (36) coupled to a coupling arm (35) extending from one side of the shutter member and that is engaged on a movement limiter (45) provided on the cartridge body, when the shutter member is in a position to cover the head opening, to limit the shutter member from moving in a direction of uncovering the head opening.

9 Claims, 20 Drawing Sheets

DISC CARTRIDGE, AND DISC RECORDING AND/OR REPRODUCING DEVICE USING THE SAME

TECHNICAL FIELD

The present invention relates to a disk cartridge having encased therein a disk used as an information recording medium, such as an optical disk or the like, and a disk recording and/or playback apparatus using the disk cartridge as a recording medium.

This application claims the priority of the Japanese Patent Application No. 2004-114593 filed on Apr. 8, 2004 and No. 2004-140474 filed on May 10, 2004, the entireties of which are incorporated by reference herein.

BACKGROUND ART

Conventionally, there is widely used a disk cartridge having rotatably encased therein a disk used as an information recording medium, such as an optical disk or the like, and that can be loaded into a disk recording and/or playback apparatus while having the disk kept encased therein. Since the disk cartridge has the disk encased in the body thereof, it can protect the disk and easily be loaded into, or unloaded from, the disk recording and/or playback apparatus.

Since the disk cartridge of this type can be loaded into a disk recording and/or playback apparatus while having the disk encased in the body thereof, the cartridge body has formed therein a driving opening through which a disk rotation driving mechanism to rotate the disk is exposed to outside and a write and/or read opening through which a part of the signal recording area of the disk, ranging from the inner to outer radius, is exposed to outside.

Also, the disk cartridge having the disk encased therein has provided therein a shutter member that covers and uncovers at least the write and/or read opening in order to prevent dust or the like from coming into the cartridge body and contaminating the disk.

Further, to prevent the write and/or read opening from being inadvertently uncovered while the disk cartridge is being stored being not loaded in any disk recording and/or playback apparatus and any foreign matter such as the finger or the like from coming into the cartridge body through the write and/or read opening and damaging the disk in the cartridge body, it is proposed to always force the shutter member with a forcing member such as a spring in a direction of covering the write and/or read opening.

Also, for easier installation of the spring member that forces the shutter member, it has been proposed in the Japanese Patent Application Laid Open No. 212872 of 1991 (will be referred to as "Patent Document 1" hereunder) and Japanese Utility Model Application Laid Open No. 83274 of 1987 (will be referred to as "Patent Document 2" hereunder) to provide a spring member integrally on the shutter member in such a manner that the spring member will be secured to the cartridge body when the shutter member is installed to the cartridge body.

In the disk cartridge disclosed in the Patent Document 1, the shutter member is only forced in a direction of covering the write and/or read opening. So, when the shutter member is pushed against the force of the spring member while being held by the hand and fingers, for example, the shutter member will easily be moved in a direction of uncovering the write and/or read opening.

In the disk cartridge disclosed in the Patent Document 2, there is provided a shutter movement limiting member that locks, in the covering position, the shutter member having been moved to a position to cover the write and/or read opening. In this disk cartridge, the write and/or read opening can positively be covered with the shutter member locked in place by the shutter movement limiting member. Since the shutter movement limiting member is provided independently of the shutter member on the cartridge body, however, it adds to the number of parts of the disk cartridge and also leads to a more difficult assembling of the disk cartridge. Also, the cartridge body should have provided therein a space where the shutter movement limiting member is to be installed, that will make it difficult to design a smaller disk cartridge.

DISCLOSURE OF THE INVENTION

Accordingly, the present invention has an object to overcome the above-mentioned drawbacks of the conventional disk cartridges by providing an improved and novel disk cartridge and a disk recording and/or playback apparatus using the disk cartridge as a recording medium.

The present invention has another object to provide a disk cartridge capable of positively covering a write and/or read opening formed therein and positively protecting a disk encased in the body thereof.

The present invention has still another object to provide a smaller disk cartridge.

The above object can be attained by providing a disk cartridge including according to the present invention:

a cartridge body having a disk encased rotatably therein and having formed therein a write and/or read opening through which a part of the disk, ranging from the inner to outer radius, is exposed to outside;

a shutter member including a shutter that covers and uncovers the write and/or read opening and a movement guide piece opposite to one side of the cartridge body, and installed to the cartridge body to be movable between a position to cover the write and/or read opening and a position to uncover the write and/or read opening;

a pressing portion installed to the shutter member to face a window formed in the movement guide piece opposite to the one side of the cartridge body;

an elastic moving piece installed to the shutter member to force the pressing portion to outside of the cartridge body; and a shutter movement limiter provided on the shutter member and that is engaged on a movement limiter provided on the cartridge body, when the shutter member is in a position to cover the write and/or read opening, to limit the shutter member from moving in a direction of uncovering the write and/or read opening, and moves in a direction in which it is disengaged from the movement limiter when the pressing portion is pressed inwardly of the cartridge body.

In the above disk cartridge according to the present invention, there is further provided an coupling arm extending from the one side of the shutter member, the elastic moving piece is installed to extend along the coupling arm with the base end thereof being fixed to the free end of the coupling arm, and the pressing portion is installed to the free end of the elastic moving piece.

Also, the shutter movement limiter may be provided on a shutter movement limiting member provided rotatably on the shutter member. When the shutter member is in the position to cover the write and/or read opening, the shutter movement limiter provided on the shutter movement limiting member is engaged on the movement limiter provided on the cartridge member to limit the movement of the shutter member in the direction of uncovering the write and/or read opening, the pressing portion provided on the shutter movement limiting member is pressed inwardly of the cartridge body, and the shutter movement limiting member is pivoted outwardly of the cartridge body to disengage the shutter member from the movement limiter.

Further, the shutter movement limiter moves in relation to the cartridge body in a direction in which the shutter member covers the write and/or read opening, and it is elastically returned to its initial position and engaged on the movement limiter provided on the cartridge body to limit the shutter member from moving in the direction of uncovering the write and/or read opening.

Also the above object can be attained by providing a disk recording and/or playback apparatus including according to the present invention:

a cartridge holder into which there is removably inserted a disk cartridge including:
a disk;
a cartridge body having the disk rotatably encased therein and having formed therein a write and/or read opening through which a part of the disk, ranging from the inner to outer radius, is exposed to outside;
a shutter member including a shutter that covers and uncovers the write and/or read opening, and installed to the cartridge body to be movable between a position to cover the write and/or read opening and a position to uncover the write and/or read opening;
a pressing portion installed to the shutter member to face a window formed in a movement guide piece provided opposite to the one side of the cartridge body;
an elastic moving piece installed to the shutter member to force the pressing portion to outside of the cartridge body; and
a shutter movement limiter provided on the shutter member and that is engaged on a movement limiter provided on the cartridge body, when the shutter member is in a position to cover the write and/or read opening, to limit the shutter member from moving in a direction of uncovering the write and/or read opening, and moves in a direction in which it is disengaged from the movement limiter when the pressing portion is pressed inwardly of the cartridge body,
the cartridge holder including a shutter releasing mechanism that disengages the shutter movement limiter from the movement limiter by moving the elastic moving piece against the force of the latter inwardly of the cartridge body when the disk cartridge is inserted into the cartridge holder and moves the shutter member in a direction of uncovering the write and/or read opening.

Also the above object can be attained by providing a disk cartridge including:
a disk;
a cartridge body having the disk rotatably encased therein and having formed therein a write and/or read opening through which a part of the disk, ranging from the inner to outer radius, is exposed to outside;
a shutter member including a shutter that covers and uncovers the write and/or read opening, and installed to the cartridge body to be movable between a position to cover the write and/or read opening and a position to uncover the write and/or read opening;
a coupling arm extending from one side of the shutter member;
an elastic moving piece installed to the free end of the shutter member to extend along the coupling arm with the base end thereof being fixed to the free end of the coupling arm, including a pressing portion provided at the base end of the shutter to face a window formed in a movement guide piece provided opposite to the one side of the cartridge body, and forced to project the pressing portion to outside of the cartridge body; and
a shutter movement limiter provided at the middle of the elastic moving piece and that is engaged on a movement limiter provided on the cartridge body, when the shutter member is in a position to cover the write and/or read opening, to limit the shutter member from moving in a direction of uncovering the write and/or read opening, and pivots along with the elastic moving piece in a direction in which it is disengaged from the movement limiter when the elastic moving piece is pressed against its own force by the pressing portion, the disk cartridge being removably placed on a cartridge mount, the disk cartridge including a pressure avoiding member provided in the cartridge body to position the pressing portion that presses the elastic moving piece of a shutter releasing mechanism, when the disk cartridge is mounted on the cartridge mount, to disengage the shutter movement limiter from the movement limiter by pivoting the elastic moving piece against the force of the latter and avoid pressing of the cartridge body by the shutter releasing mechanism.

In the above disk cartridge according to the present invention, since the shutter movement limiter to limit the shutter member that is to cover and uncover the write and/or read opening formed in the cartridge body from moving in the direction of uncovering the write and/or read opening when the shutter member is in a position to cover the write and/or read opening, and the elastic moving piece to force the shutter movement limiter from in the direction of uncovering the write and/or read opening, are provided at the shutter member, it is possible to positively cover the write and/or read opening and protect a disk-shaped recording medium encased in the cartridge body by limiting the shutter member in a position to cover the write and/or read opening from moving in the direction of uncovering the write and/or read opening.

Also, in the above disk cartridge according to the present invention, since the shutter movement limiter and a forcing member to force the shutter movement limiter in a direction in which the latter is engaged on the movement limiter provided on the cartridge body, the disk cartridge can be formed from a reduced number of parts and it can be designed more smaller because it is not necessary to provide a space in which the shutter movement limiter is installed.

Also, in the above disk recording and/or playback apparatus using the disk cartridge according to the present invention as a recording medium, since, when the disk cartridge is inserted into the cartridge holder that is inserted first at the side thereof perpendicular to the one side of the cartridge body on which the shutter member moves, a shutter releaser of the shutter releasing mechanism enters the window formed in the movement guide piece of the shutter member to press the elastic moving piece that will thus be elastically moved for the shutter movement limiter to take a position where it will not engage on the movement limiter provided at the cartridge body, the shutter releasing mechanism may be of a simple structure in which the shutter releaser is provided at one end of a leaf spring and the disk recording and/or playback apparatus itself can be designed simpler and more compact.

Further, the above disk cartridge having provided thereon the shutter member to cover and uncover the write and/or read opening and a mechanism to hold the shutter member in the covered position can be mounted stably on the cartridge mount with no load being applied from the shutter releasing mechanism.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The present invention will be described in detail below concerning the embodiments of the disk cartridge and disk recording and/or playback apparatus compatible with the disk cartridge as a recording medium with reference to the accompanying drawings.

Figure 1:
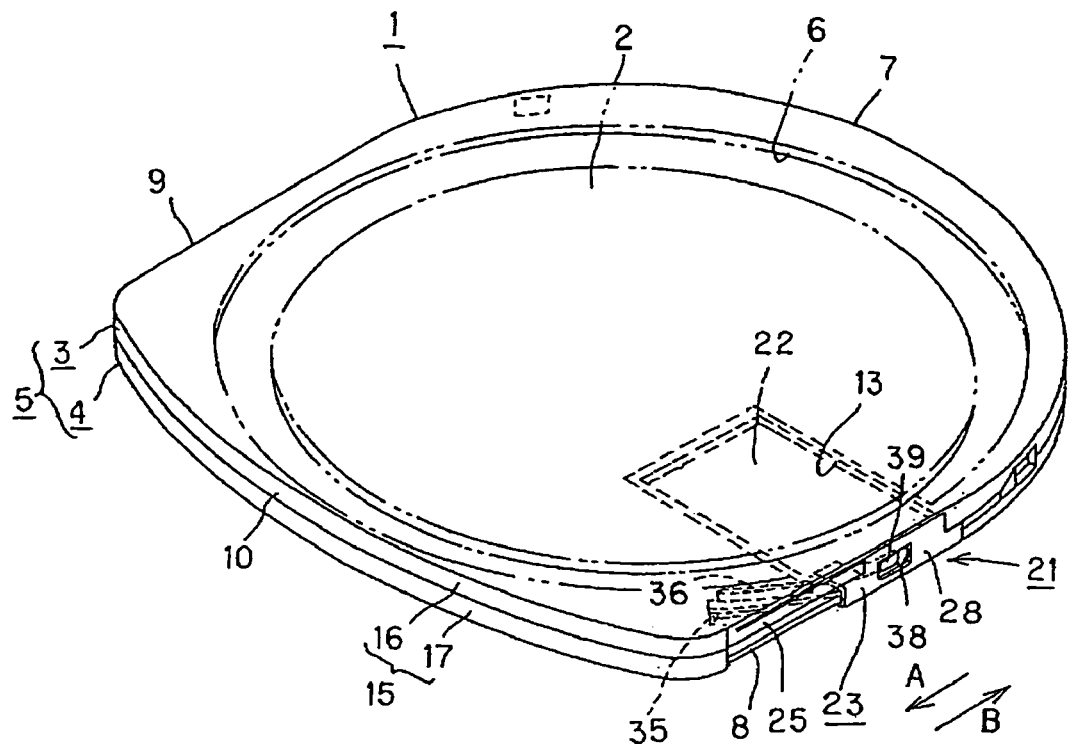
FIG. 1 is a perspective view, from the upper half, of a first embodiment of the disk cartridge according to the present invention.
Figure 2:
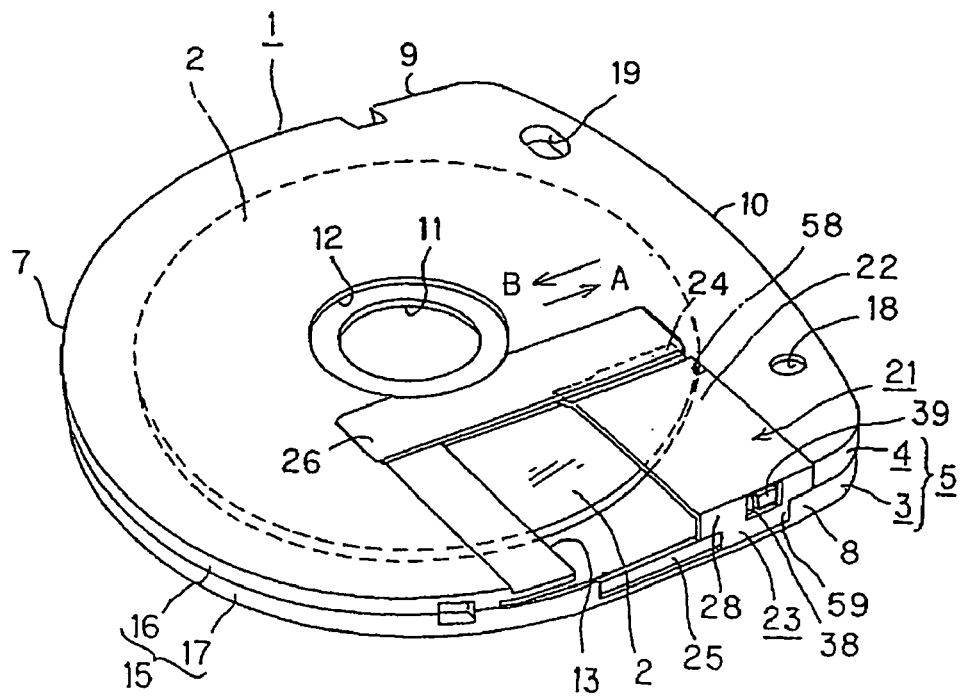
FIG. 2 is a perspective view, from the lower part, of the disk cartridge as the first embodiment of the present invention.

First, there will be described a first embodiment of the disk cartridge, generally indicated with a reference numeral 1, according to the present invention. The disk cartridge 1 according to the present invention has encased rotatably therein, for example, an optical disk 2 used as an information recording medium. As shown in FIGS. 1 and 2, the disk cartridge 1 includes a cartridge body 5 formed from a pair of upper and lower halves 3 and 4 butt-joined to each other, and has the optical disk 2 encased rotatably in the cartridge body 5.

The disk cartridge 1 according to the present invention has encased therein an optical disk 2 that has recorded therein program data or video data for performing a TV game, for example, and it is designed very compact. Since the diameter of the optical disk 2 encased in the disk cartridge 1 is so small as about 60 mm, for example, the disk cartridge 1 can be held in one hand.

Figure 3:
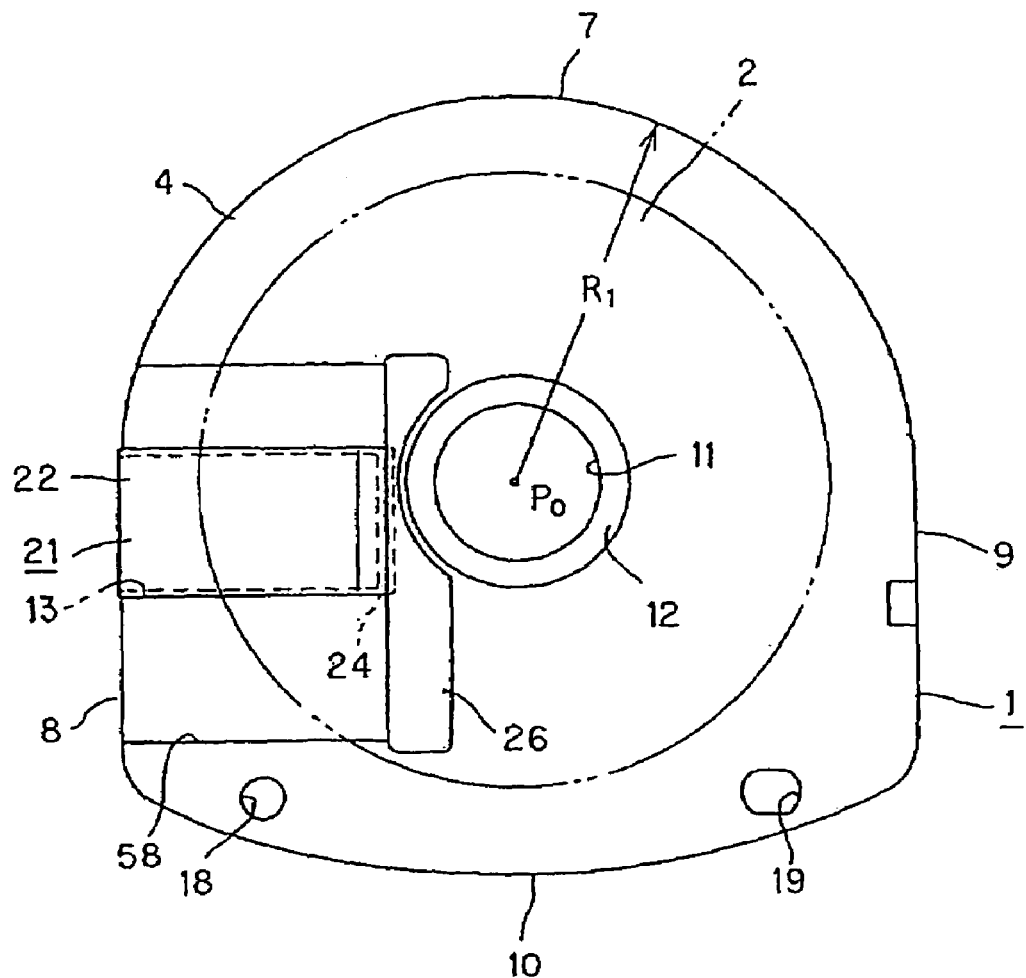
FIG. 3 is a plan view, from the lower half, of the disk cartridge as the first embodiment of the present invention.

As shown in FIGS. 1 to 3, the cartridge body 5 of the disk cartridge 1 has a circular front side 7 at which the disk cartridge 1 is first introduced into the disk recording and/or playback apparatus (will be referred to as "disk recorder and/or player" hereunder). The circular front side 7 is shaped to have the general form of a half circle having a constant radius $R_1$ from the center $P_o$ of the optical disk 2 encased in a disk receptacle 6 of the cartridge body 5 as shown in FIG. 3. That is, the circular front side 7 generally corresponds to a half of the optical disk 2 encased in the cartridge body 5.

The cartridge body 5 has lateral sides 8 and 9 opposite and parallel to each other and contiguous to the semi-circular front side 7, and a gently curved side 10 opposite to the semi-circular front side 7 and contiguous to the lateral sides 8 and 9. That is, the rear curved side 10 is larger in radius than the semi-circular front side 7.

Since the disk cartridge 1 according to the present invention has the front side 7 thereof formed nearly semi-circular at which the disk cartridge 1 is first introduced into the disk recorder and/or player as above, it is possible to easily know at which end the disk cartridge 1 should be inserted first into the disk recorder and/or player through a cartridge slot. More specifically, the semi-circular shape of the front side of the disk cartridge 1 designed so small that it can be held on the palm will assure the user to know in which direction the disk cartridge 1 should be slotted in while holding it in one hand. So, the user can correctly slot the disk cartridge 1 into the disk recorder and/or player without any failure. Namely, the user can insert the disk cartridge 1 into the slot-in type disk recorder and/or player easily and positively as will further be described later.

Further, because of the above-mentioned circularity of the front side 7 (insertion end) and rear side 10, the disk cartridge 1 can be designed as small as an optical disk 2 to be encased.

The lower half 4 of the disk cartridge 1 according to the present invention, forming the lower side of the cartridge body 5, has formed therein a circular drive opening 12 through which a central hole 11 formed in the center of the optical disk 2 encased in the cartridge body 5 and its perimeter are exposed to outside as shown in FIGS. 2 and 3. For example, the drive opening 12 is provided to receive a turn table as a part of a disk rotation driving mechanism provided at the disk recorder and/or player in which the disk cartridge 1 is to be loaded. That is, the drive opening 12 is to receive a part of a rotation driving mechanism for the optical disk 2.

Also, as shown in FIGS. 2 and 3, the lower half 4 has formed therein a head opening 13 which is a write and/or read opening. The head opening 13 is located at one (8) of the lateral sides of the cartridge body 5 and shaped to have the form of a rectangle extending to near the drive opening 12 from the lateral side 8. More specifically, the rectangular form of the head opening 13 is large enough to expose, to outside, a part of the signal recording area of the optical disk 2 encased in the cartridge body 2, ranging from the inner to outer radius. As shown in FIG. 2, the head opening 13 is open at one (8) of the lateral sides of the cartridge body 5. Since the head opening 13 is open at the lateral side 8, the write/read head can scan up to the outermost radius of the optical disk 2. Therefore, the signal recording area of the optical disk 2 can be increased and thus the recording capacity of the optical disk 2 be increased correspondingly. Also, since the head opening 13 is only extending to a position short of the drive opening 12, a portion left between the head opening 13 and drive opening 12 will contribute to maintaining the mechanical strength of the lower half 4.

The upper half 3 and lower half 4 are butt-joined to each other to form the cartridge body 5, and the surface of the upper half 3, opposite to the optical disk 2, forms the upper surface of the cartridge body 5. This surface of the upper half 3 is a flat one having no opening or the like formed therein as shown in FIG. 1.

The upper and lower halves 3 and 4 have rising peripheral walls 16 and 17, respectively. When they are butt-joined to each other, the rising peripheral walls 16 and 17 form together a rising peripheral wall 15 of the cartridge body 5.

Also, as shown in FIGS. 2 and 3, the lower half 4 has formed therein first and second positioning holes 18 and 19 in which positioning pins provided at the disk recorder and/or player are to be engaged when the disk cartridge 1 is loaded in the disk recorder and/or player. It should be noted that the first and second positioning holes 18 and 19 are formed in left and right positions in an area defined between the disk receptacle 6 shaped to be circular and the curved side 10 (read end) of the disk cartridge 1).

As shown in FIGS. 1 to 3, a shutter member 21 to cover and uncover the head opening 13 is installed to the cartridge body 5 constructed as above. The shutter member 21 is formed by punching and bending a thin metal sheet or by molding from a synthetic resin material. As shown in FIGS. 2 and 3, the shutter member 21 includes a flat shutter 22 shaped to have the form of a rectangle large enough to cover the head opening 13, and a cartridge support 23 formed at the base end of the shutter 22 to have a C-shaped section. The shutter 22 has provided at the free end thereof a guide support 24 supported on a shutter guide member 26 that is installed to the cartridge body 5. The guide support 24 is formed by bending the free end of the shutter 22 toward the cartridge body 5 as shown in FIGS. 4 and 5.

Note here that the shutter 21 is supported to be movable in the direction of arrow A or B in FIGS. 1 and 2 in which the head opening 13 is covered or uncovered with a sliding guide 25 formed at the upper half 3 of the cartridge body 5 being supported on the cartridge support 23.

Figure 4:
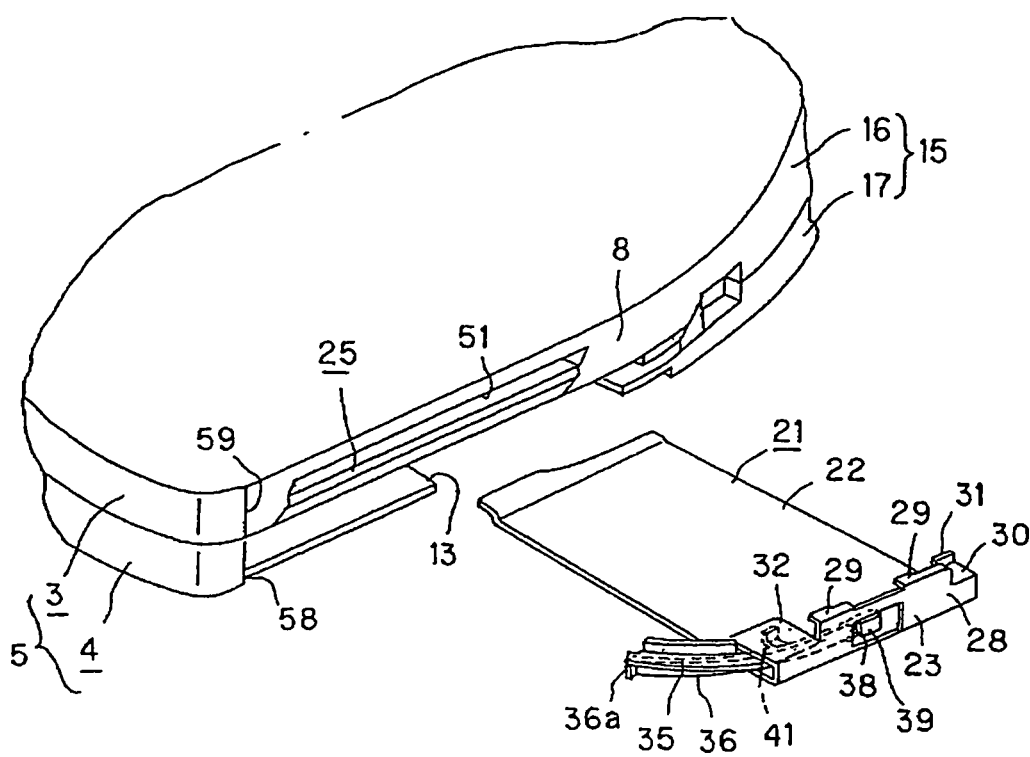
FIG. 4 is a perspective view of a shutter member and cartridge body having the shutter member installed thereon in the disk cartridge.

As shown in FIG. 4, the sliding guide 25 supporting the shutter 21 is formed on the upper half 3 over the moving range of the shutter member 21 to cover and uncover the head opening 13. The sliding guide 25 is formed on a part of the rising peripheral wall 16 of the upper half 3 to support the shutter member 21 within the extending range of the one lateral side 8 of the cartridge body 5.

Figure 5:
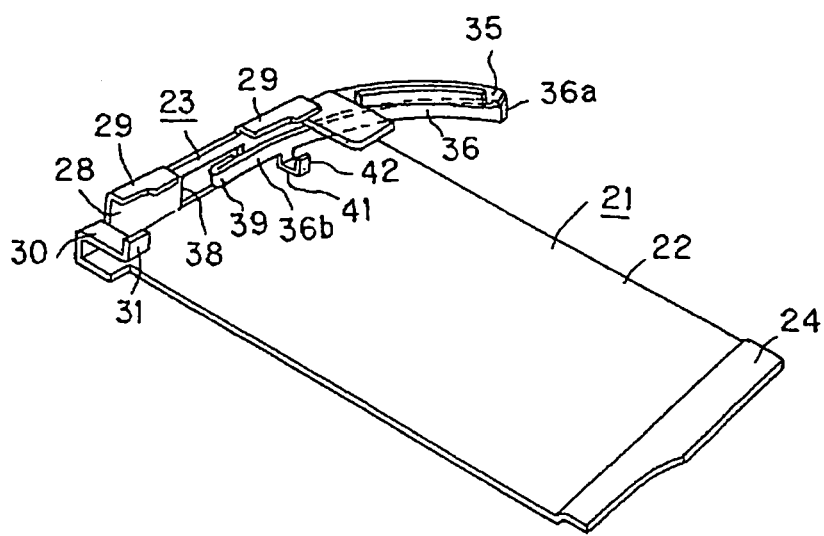
FIG. 5 is a perspective view of an elastic moving piece on which a shutter movement limiter is provided and the shutter member on which the elastic moving piece is installed.

As shown in FIGS. 4 and 5, the cartridge support 23 provided on the shutter member 21 has a movement guide piece 28 formed thereon to rise vertically from the base end of the shutter 22, and a pair of first support pieces 29 bent toward the shutter 22 is formed at the free end of the movement guide piece 28. Also, on one side of the movement guide piece 28, there is provided a second support piece 30 bent in an L shape at a level one step lower than where the pair of second support pieces 29 is formed. The second support piece 30 supports, together with the pair of first support pieces 29, the sliding guide 25 between them. The second support piece 30 has formed at the free end thereof an engagement piece 31 bent to project toward the first supports 29.

Also, on the other side of the movement guide piece 28, there is formed at the same height as the second support piece 30 a piece 32 bent to project toward the shutter 22. Similarly to the second support piece 30, the bent piece 32 supports, together with the first support pieces 29, the sliding guide 25 between them. On one side of the bent piece 32, there is formed an engagement piece 33 bent to project toward the first support pieces 29.

Figure 6:
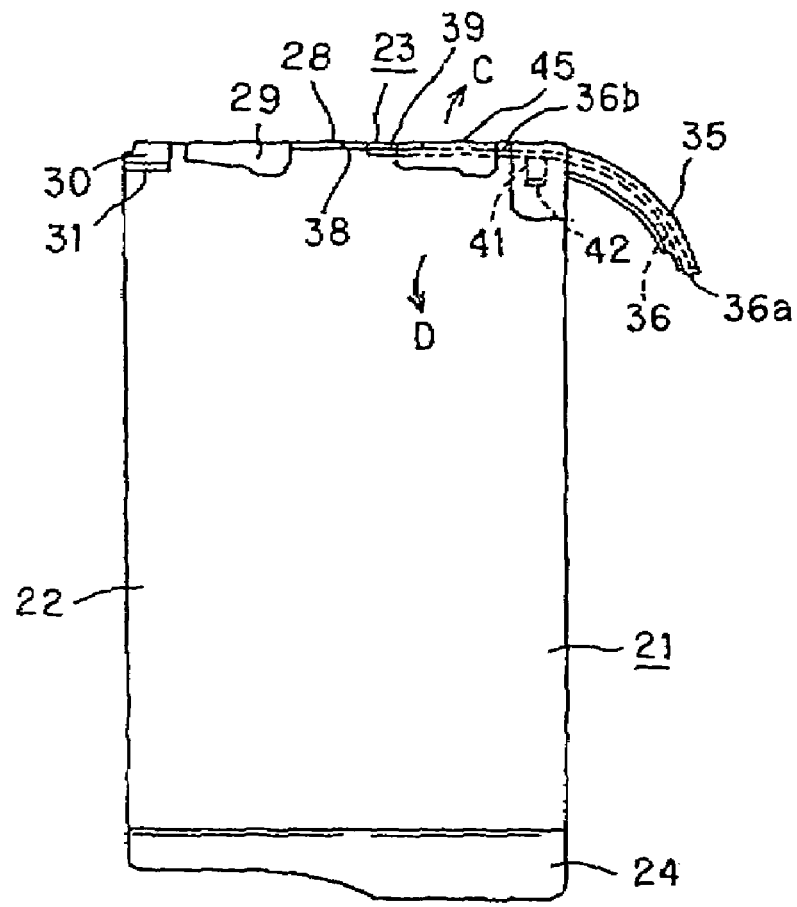
FIG. 6 is a plan view of the shutter member having the elastic moving piece installed thereon.

As shown in FIGS. 4 and 5, a coupling arm 35 extends from one side of the movement guide piece 28 included in the cartridge support 23 of the shutter member 21. More specifically, as shown in FIG. 6, the coupling arm 35 is formed to extend from one side of the movement guide piece 28 located at a side where the shutter member 21 installed to the cartridge body 5 is moved in the direction of uncovering the head opening 13. Also, with the shutter member 21 being installed to the cartridge body 5, the coupling arm 35 extends from the one side of the movement guide piece 28 while being bent to extend along the outer circumference of the circular disk receptacle 6. That is, the coupling arm 35 extends being bent toward the free end of the shutter member 22 where the guide support 24 is provided.

As shown in FIG. 6, an elastic moving piece 36 is coupled to the free end of the coupling arm 35 to extend along the coupling arm 35 with the base end thereof being fixed. The elastic moving piece 36 is coupled to the coupling arm 35 by welding or bonding the base end thereof to the free end of the coupling arm 35. At this time, the elastic moving piece 36 is positioned in relation to the coupling arm 35 with a bent portion 36a of the base end being placed to abut on the free end of the coupling arm 35.

Figure 7:
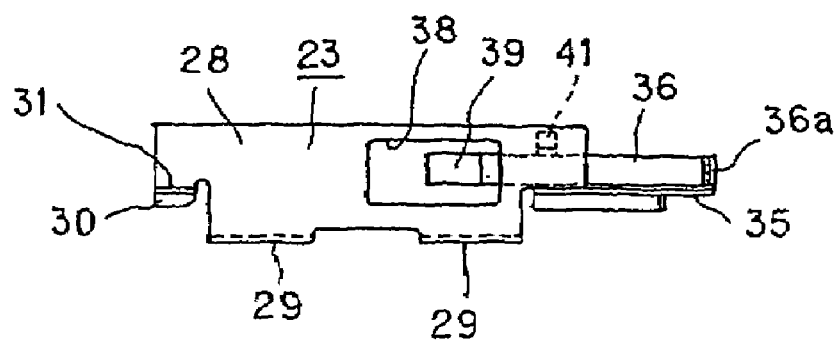
FIG. 7 is a front view, from a movement guide piece, of the shutter member having the elastic moving piece installed thereon.

As shown in FIGS. 6 and 7, the elastic moving piece 36 is provided at the base end of the shutter 22 and formed to have a length reaching a window 38 formed in the movement guide piece 28 opposite to one side of the cartridge body 5, and a pressing portion 39 is provided at the free end, facing the window 38, of the elastic moving piece 36. When the disk cartridge 1 according to the present invention is loaded into the disk recorder and/or player, the pressing portion 39 is to be pressed by a shutter releaser as a part of a shutter releasing mechanism provided at the disk recorder and/or player.

Further, the elastic moving piece 36 is coupled to the coupling arm 35 to be applied with a force under which the pressing portion 39 is projected from the window 38 while the free end of the elastic moving piece 36 is being pressed in contact with the inner surface of the movement guide piece 28. That is, the elastic moving piece 36 is extended toward the movement guide piece 28 while being bent from the base end thereof coupled to the coupling arm 35, and pressed in contact at the free end thereof with the inner surface of the movement guide piece 28 to be applied with a force in the direction of arrow C in FIG. 6.

Note that the elastic moving piece 36 has a straight portion 36b extending in parallel with the movement guide piece 28.

As shown in FIGS. 6 and 7, a shutter movement limiter 41 is provided integrally at the midpoint of the elastic moving piece 36. The shutter movement limiter 41 is provided at the base end of the straight portion 36b of the elastic moving piece 36. It is formed by bending the free end of a projection from one side of the elastic moving piece 36 into an L shape. The L-shaped free end of the shutter movement limiter 41 provides an engaging portion 42 that limits the shutter member 21 in the position to cover the head opening 13 from moving in a direction of uncovering the head opening 13 by abutting on a movement limiter 45 provided at the cartridge body 5 when the shutter member 21 is installed to the cartridge body 5.

Note here that when the pressing portion 39 is pressed and thus the elastic moving piece 36 is elastically moved to pivot in the direction of arrow D in FIG. 6, the shutter movement limiter 41 will pivot along with the elastic moving piece 36 to move the engaging portion 42 from a position where it abuts on the movement limiter 45 provided at the cartridge body 5 so that the shutter member 21 becomes movable in the direction of uncovering the head opening 13.

Note that when the disk cartridge 1 according to the present invention is loaded into the disk recorder and/or player, the pressing portion 39 is pressed by the shutter releaser as a part of the shutter releasing mechanism provided at the disk recorder and/or player and thus the elastic moving piece 36 is elastically moved in the direction of arrow D in FIG. 6.

The shutter member 21 constructed as above is installed movably on the cartridge body 5 with the sliding guide 25 being supported on the cartridge support 23.

Figure 8:
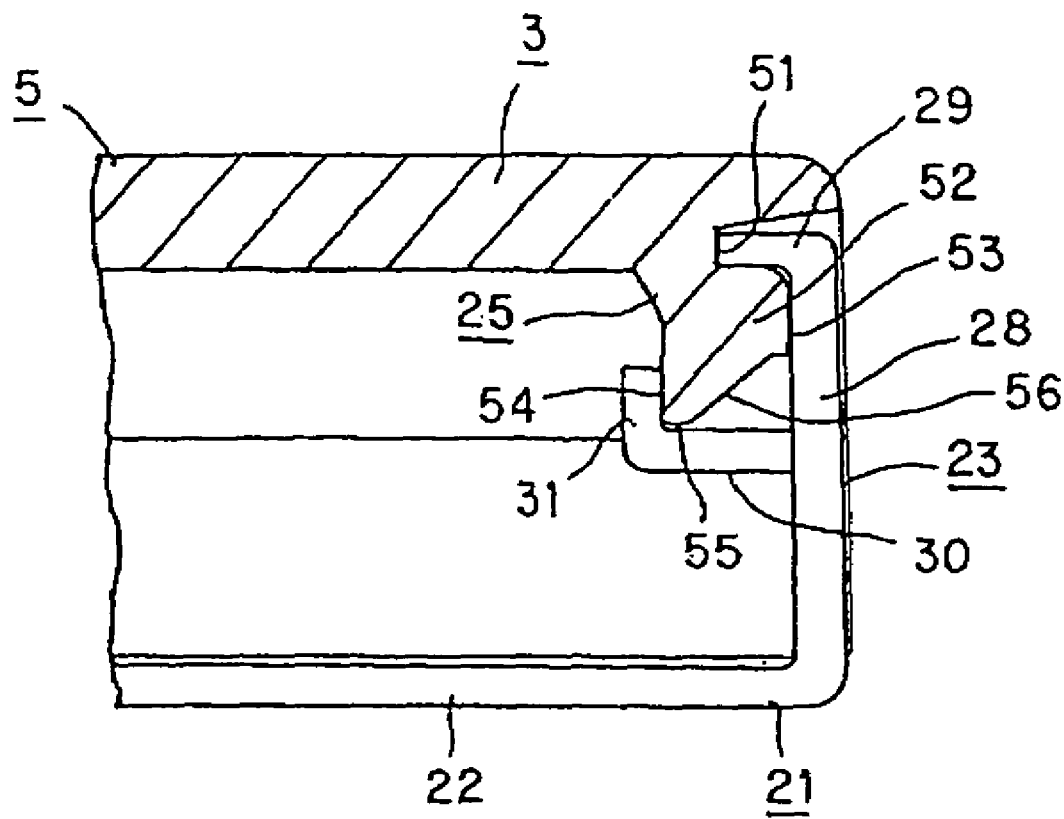
FIG. 8 is a sectional view of the shutter member installed to a guide rail provided at the upper half.

Note here that the sliding guide 25 supporting the shutter member 21 movably is formed on a part of the rising peripheral wall 16 of the upper half 3 as shown in FIGS. 4 and 8. As shown in FIG. 8, the sliding guide 25 includes a guide recess 51 formed at the outer side of the rising peripheral wall 16 in parallel to the moving direction of the shutter member 21, and a guide rail 52 supported on the first and second support pieces 29 and 30.

The outer side of the guide rail 52 is perpendicular to the plane of the upper half 3. The outer side of the guide rail 52 is opposite to the inner side of the movement guide piece 28 included in the sliding guide 25 to provide a first guide wall 53 for guiding the moving direction of the shutter member 21. The inner side of the guide rail 52 is parallel to the first guide wall 53. This inner side of the guide rail 52 is opposite to the second support piece 30 and bent piece 32 to provide a second guide wall 54 for guiding the moving direction of the shutter member 21. Further, the end face of the guide rail 52 is perpendicular to the first and second guide walls 53 and 54. This end face is opposite to the second support piece 30 and bent piece 32 to provide a third guide wall 55 for guiding the moving direction of the shutter member 21. Also, the end corner of the guide rail 52, connecting the first guide wall 53 and third guide wall 55, is an inclined surface 56. This inclined surface 56 provides a runout when the engagement pieces 31 and 33 provided on the shutter member 21 are engaged on the second guide wall 54 of the guide rail 52.

To support the shutter member 21 on the sliding guide 25 constructed as above, the shutter 22 is placed to extend over the head opening 13 formed in the lower half 4, and then the cartridge support 23 is engaged on the sliding guide 25. To support the cartridge support 23 on the sliding guide 25, first the first support pieces 29 are engaged in the guide recess 51, and then the engagement pieces 31 and 33 are placed along the inclined surface 56 and opposite to the second guide wall 54 of the guide rail 52. With the first support pieces 29 engaged in the guide recess 51 and engagement pieces 31 and 33 placed opposite to the second guide wall 54 as above, the shutter member 21 is supported movably on the upper half 3 with the guide rail 52 being laid between the first and second support pieces 29 and 30 and a part of the bent piece 32 as shown in FIG. 8.

At this time, the sliding guide 25 is limited from moving in the moving direction of the shutter member 21 and in the direction of the thickness of the cartridge body 5 perpendicular to the moving direction of the shutter member 21 because the movement guide piece 28 is opposite to the first guide wall 53, the engagement pieces 31 and 33 are opposite to the second guide wall 54 and the second support piece 30 and bent piece 32 are opposite to the third guide wall 55. Thus, the shutter member 21 is movable being stably guided by the sliding guide 25 without causing any large shake.

Also, since the guide support 24 provided at the free end of the shutter 22 is supported on the shutter guide member 26 as shown in FIG. 2 when the shutter member 21 is installed to the cartridge body 5, the shutter 22 can be prevented from lifting from the cartridge body 5, thereby assuring a stable movement of the shutter member 21.

As mentioned above, the shutter member 21 installed to the cartridge body 5 is moved along the guide rail 52 between the position to cover the head opening 13 as shown in FIG. 3 and position to uncover the head opening 13 as shown in FIG. 2.

Note that in the disk cartridge 1 according to the present invention, the shutter member 21 is installed to the cartridge body 5 not to project from the outer surface of the cartridge body 5. More particularly, the shutter member 21 is installed to the cartridge body 5 to be flush with the outer surface of the cartridge body 5. That is, in the area of the lower half 4 where the shutter 22 moves, there is formed a shutter sliding concavity 58 as shown in FIGS. 2 and 3. The shutter sliding concavity 58 is deep enough for the shutter 22 not to project from the surface of the cartridge body 5. Also, in one (8) of the lateral sides of the cartridge body 5 along which the movement guide piece 23 moves, there is formed a guide piece concavity 59 contiguous to the shutter sliding concavity 58. The guide piece concavity 59 is also deep enough for the movement guide piece 28 not to project from the surface of the cartridge body 5.

Also, when the shutter member 21 has been moved to the position to cover the head opening 13 as shown in FIG. 3, the shutter 22 abuts at one side thereof on the rising surface of the shutter sliding concavity 58 and is limited from further moving to the covering position.

Figure 9:
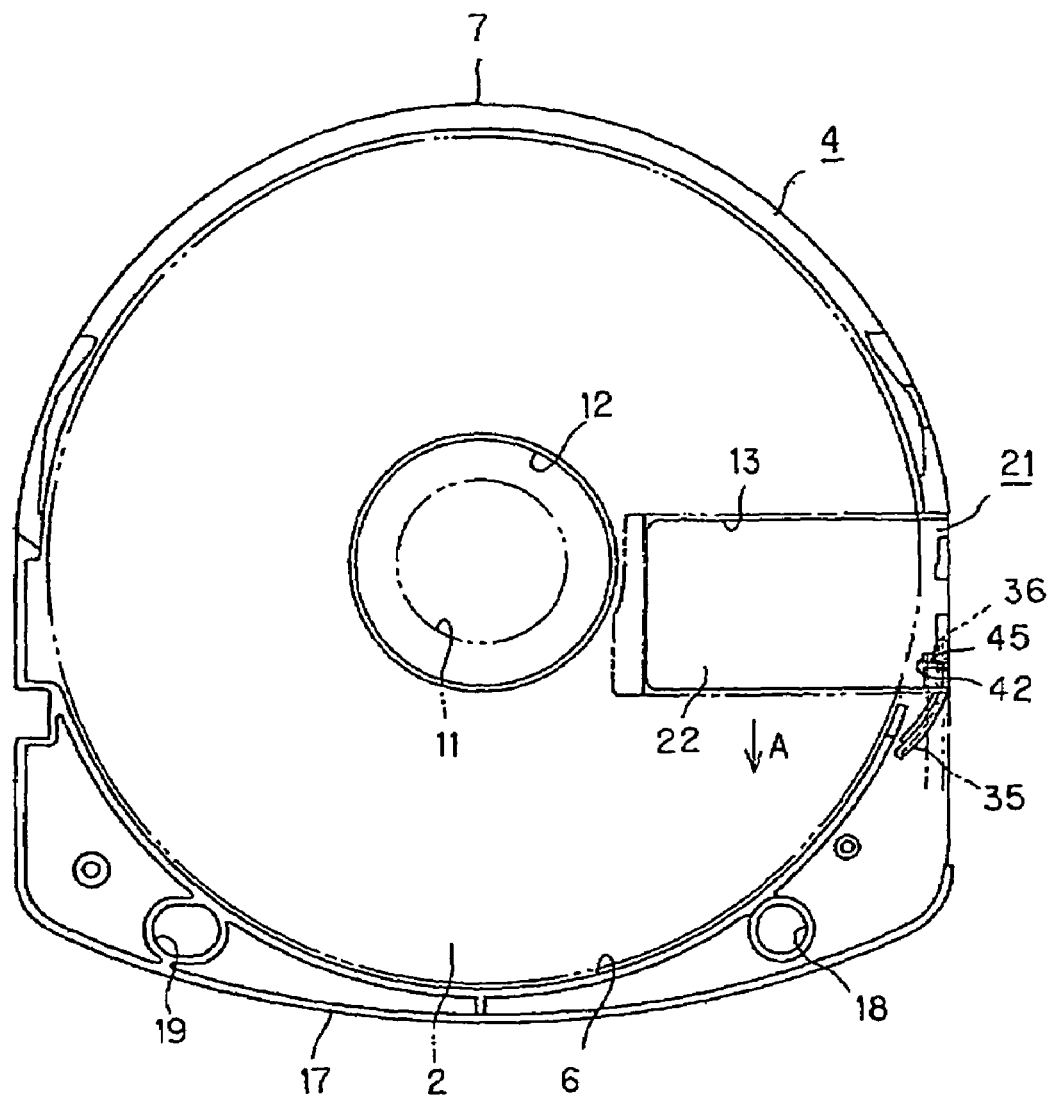
FIG. 9 is a plan view, from inside the lower half, of a head opening covered by the shutter member.

When the shutter member 21 installed movably to the cartridge body 5 as above has been moved to the position to cover the head opening 13, the engaging portion 42 provided on the shutter movement limiter 41 provided on the elastic moving piece 36 will be opposite to the movement limiter 45 provided at the cartridge body 5 as shown in FIG. 9. When the shutter member 21 is going to move in the direction of arrow A in FIG. 9 to uncover the head opening 13, the engaging portion 42 will abut on the movement limiter 45 provided at the cartridge body 5 to limit the shutter member 21 from moving and keep the head opening 13 covered with the shutter 22.

Note that the movement limiter 45 is formed by notching a part of the guide rail 52 provided on the upper half 3 as shown in FIG. 9.

Figure 10:
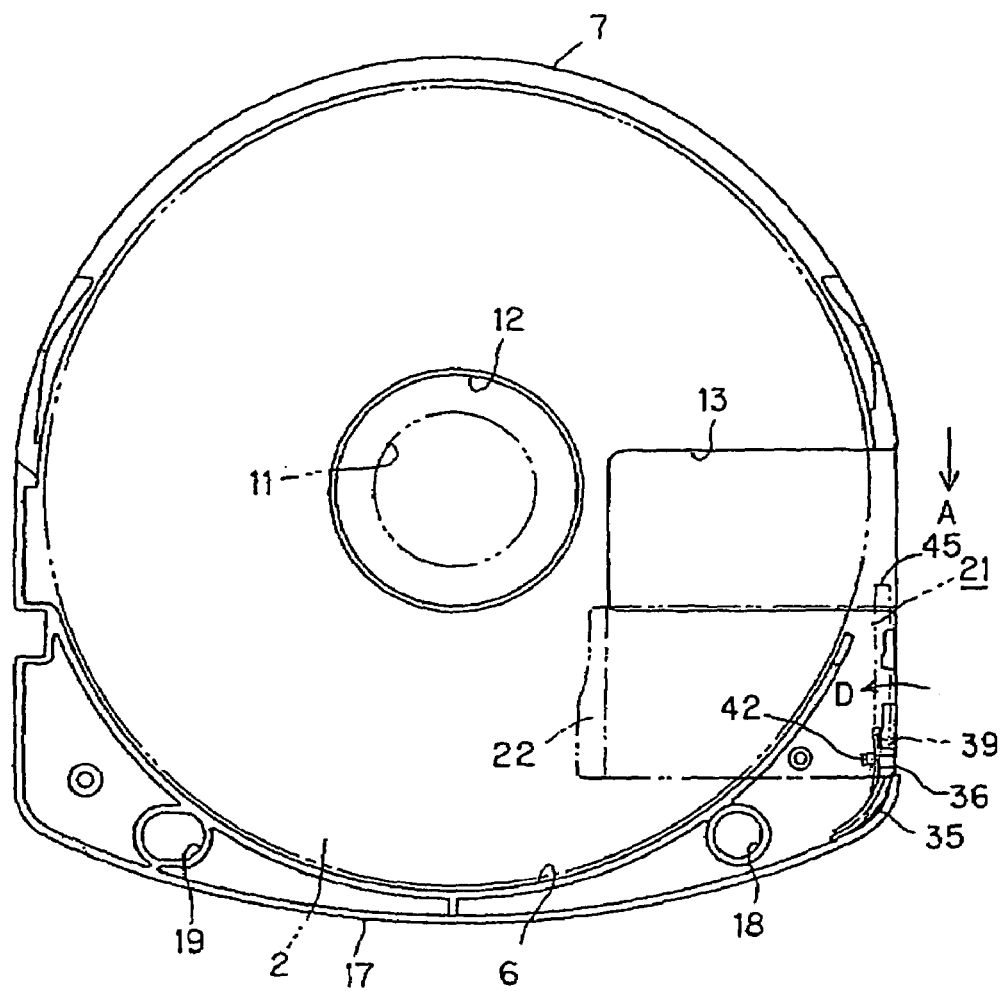
FIG. 10 is a plan view, from inside the lower half, of the shutter member moved to a position where it uncovers the head opening.

To uncover the head opening 13 by moving the shutter 21 staying in the position to cover the head opening 13 and limited from moving, the shutter releaser of the shutter releasing mechanism provided at a cartridge holder of the disk recorder and/or player is moved into the window 38 to press the pressing portion 39 and thus elastically move the elastic moving piece 36 in the direction of arrow D in FIG. 10, for example. When the elastic moving piece 36 is thus elastically moved in the direction of arrow D in FIG. 10, the shutter movement limiter 41 will also be moved along with the elastic moving piece 36 in the direction of arrow D in FIG. 10 and the engaging portion 42 will go out of the position opposite to the movement limiter 45 at the cartridge body 5. As the result, the shutter member 21 is liberated by the movement. limiter 45 from the position where it is limited from moving and becomes movable in the direction of arrow A in FIG. 10 to uncover the head opening 13.

Since in the disk cartridge 1 according to the present invention, the shutter member 21 is limited from moving in the direction of uncovering the head opening 13 as having been described above, it is possible to positively protect the optical disk encased in the cartridge body 5.

Also, since in the disk cartridge 1 according to the present invention, the elastic moving piece 36 having provided thereon the shutter movement limiter 41 to limit the shutter member 21 from moving in the direction of uncovering the head opening 13 is installed to the shutter member 21, the disk cartridge can be fromed from a reduced number parts. Further, since the shutter movement limiter 41 is provided integrally on the elastic moving piece 36 installed on the shutter member 21, any space in which the shutter movement limiter 41 is disposed has not to be provided in the cartridge body 5, which contributes to a smaller design of the disk cartridge 1.

It has been described above that by having the engaging portion 42 abut on the movement limiter 45, the shutter movement limiter 41 is made to limit the shutter member 21 from moving. However, the movement limiter 45 may be formed to have a concave recess in which the engaging portion 42 is engaged to limit the shutter member 21 from moving. That is, the engaging portion 42 and movement limiter 45 may be engaged on each other.

Next, there will be explained the movement of the shutter member 21 to cover and uncover the head opening 13 when the disk cartridge 1 according to the present invention is loaded into the disk recorder and/or player.

Figure 11:
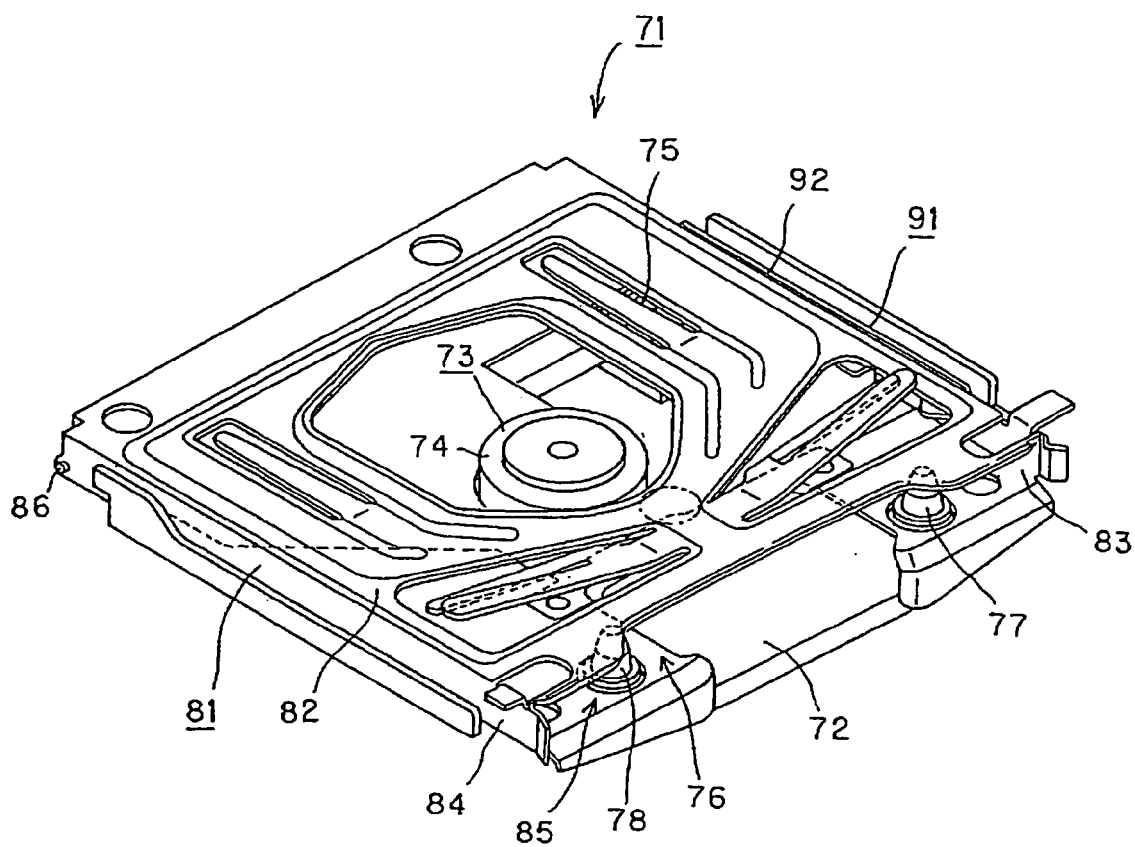
FIG. 11 is a perspective view of a disk drive of the disk recording and/or playback apparatus in which the disk cartridge according to the present invention is to be loaded.

An embodiment of the disk recorder and/or player using the disk cartridge 1 according to the present invention as a recording medium will be illustrated and described herebelow. This disk recorder and/or player includes a disk drive 71 constructed as shown in FIG. 11. The disk drive 71 has a base 72 that is formed rectangular and disposed in a housing. The base 72 has installed thereon a disk rotation driving mechanism 73 to drive the rotation of the optical disk 2 encased in the disk cartridge 1 loaded in the disk recorder and/or player. The disk rotation driving mechanism 73 is installed on the base 72 with a turn table 74 on which the optical disk 2 is to be mounted being projected to the upper surface of the base 72.

Also, the base 72 has installed thereon an optical head 75 that scans the signal recording area of the optical disk 2 loaded and rotated in the disk rotation driving mechanism 73 to read information signal recorded in the optical disk 2.

Note that in case the disk drive 71 is designed to be able to write and read information signal to and from the optical disk 2, the optical head 75 is of a write/read type.

The optical head 75 is supported by a supporting mechanism (not shown) to be movable between the inner and outer radii of the optical disk 2 placed on the disk rotation driving mechanism 73, and moved between the inner and outer radii of the optical disk 2 by a feeding mechanism with a drive motor.

Also, a cartridge mount 76 is built up on the upper surface of the base 72. The cartridge mount 76 has provided thereon a pair of positioning pins 77 and 78 and a pair of supporting pins (not shown). The disk cartridge 1 to be mounted on the cartridge mount 76 is supported on the supporting pins with the pair of positioning pints 77 and 78 being engaged in the first and second positioning holes 18 and 19 and positioned horizontally and in the direction of the height.

Also, on the upper surface of the base 72 where the cartridge mount 76 is built up, there is provided a cartridge holder 81 to hold the disk cartridge 1 and mount and remove the disk cartridge 1 onto and from the cartridge mount 76. The cartridge holder 81 is shaped to have the form of a rectangle large enough to hold the aforementioned disk cartridge 1, and has provided on both opposite sides of a top plate 82 thereof cartridge supports 83 and 84 formed to have an L-shaped section. The cartridge holder 81 is open at the front side. This front opening is used as a cartridge slot 85. The disk cartridge 1 according to the present invention is inserted first at the circular front side 7 thereof into the cartridge holder 81 through the cartridge slot 85. Also the disk cartridge 1 is removed from inside the cartridge holder 81 through the cartridge slot 85.

The above cartridge holder 81 is supported on the base 72 to be pivotable about a pivot 86 provided on either end of the rear side of the disk drive 71, opposite to the front side at which the cartridge slot 85 is provided.

The disk cartridge 1 is inserted into, and removed from, the cartridge holder 81 being pivoted to above the base 72. When the cartridge holder 81 is pivoted to the base 72 while holding the disk cartridge 1 inserted therein, the disk cartridge 1 is mounted in place on the cartridge mount 76.

Figure 12:
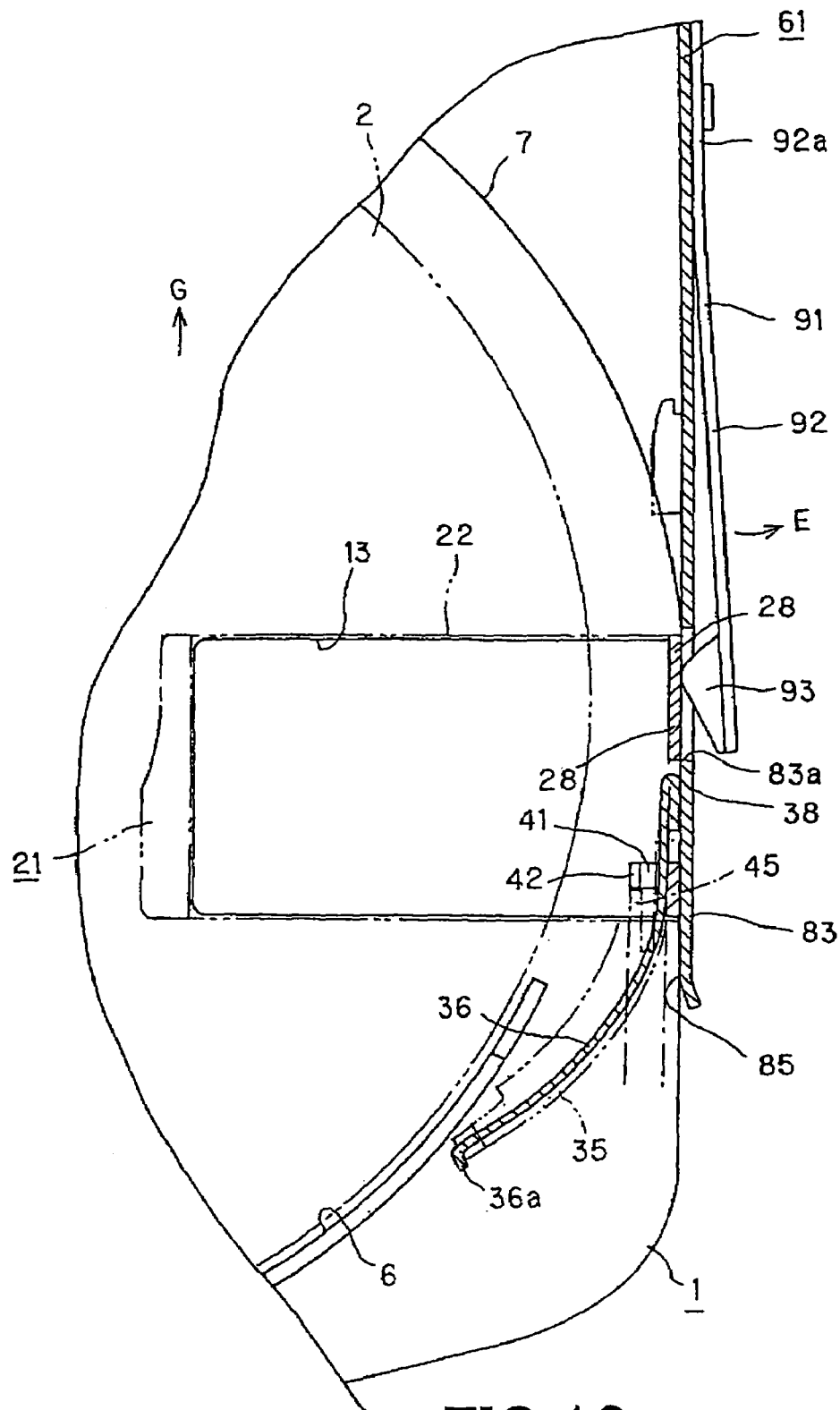
FIG. 12 is a plan view of a cartridge holder having the disk cartridge inserted therein.

Note here that the cartridge holder 81 has provided thereon a shutter releasing mechanism 91 that moves the shutter member 21 to uncover the head opening 13 when the disk cartridge 1 is inserted into the cartridge holder 81. As shown in FIG. 12, the shutter releasing mechanism 91 includes a long leaf spring 92 whose base end 92a is fixed to the outer lateral side of one (83) of the cartridge supports, and a shutter releaser 93 provided at the free end of the leaf spring 92 to project in the cartridge holder 81. The shutter releaser 93 is formed by folding a part of the free end of the leaf spring 92. Also, the shutter releaser 93 is projected in the cartridge holder 81 through a cut 83a formed in the lateral side of the one cartridge support 83.

When the disk cartridge 1 is inserted into the cartridge holder 81, the shutter releasing mechanism 91 goes into the window 38 formed in the shutter member 21 and presses the pressing portion 39 to pivot the elastic moving piece 36 in the direction of arrow D in FIG. 10 and then move the shutter member 21 in the direction of uncovering the head opening 13 in such a manner that the engaging portion 42 of the shutter movement limiter 41 will not abut on the movement limiter 45.

When the disk cartridge 1 according to the present invention is inserted into the cartridge holder 81 including the above shutter releasing mechanism 91, the shutter member 21 is moved to uncover the head opening 13 as above. This will be described in detail below.

As the disk cartridge 1 is inserted first at the circular front side 7 thereof into the cartridge holder 81, the shutter releaser 93 will run on the movement guide piece 28 of the shutter member 21 as shown in FIG. 12. At this time, the shutter releaser 93 is pressed by the movement guide piece 28 and thus the leaf spring 92 is elastically moved in the direction of arrow E in FIG. 12 to make the shutter releaser 93 escape to outside the cartridge holder 81.

Figure 13:
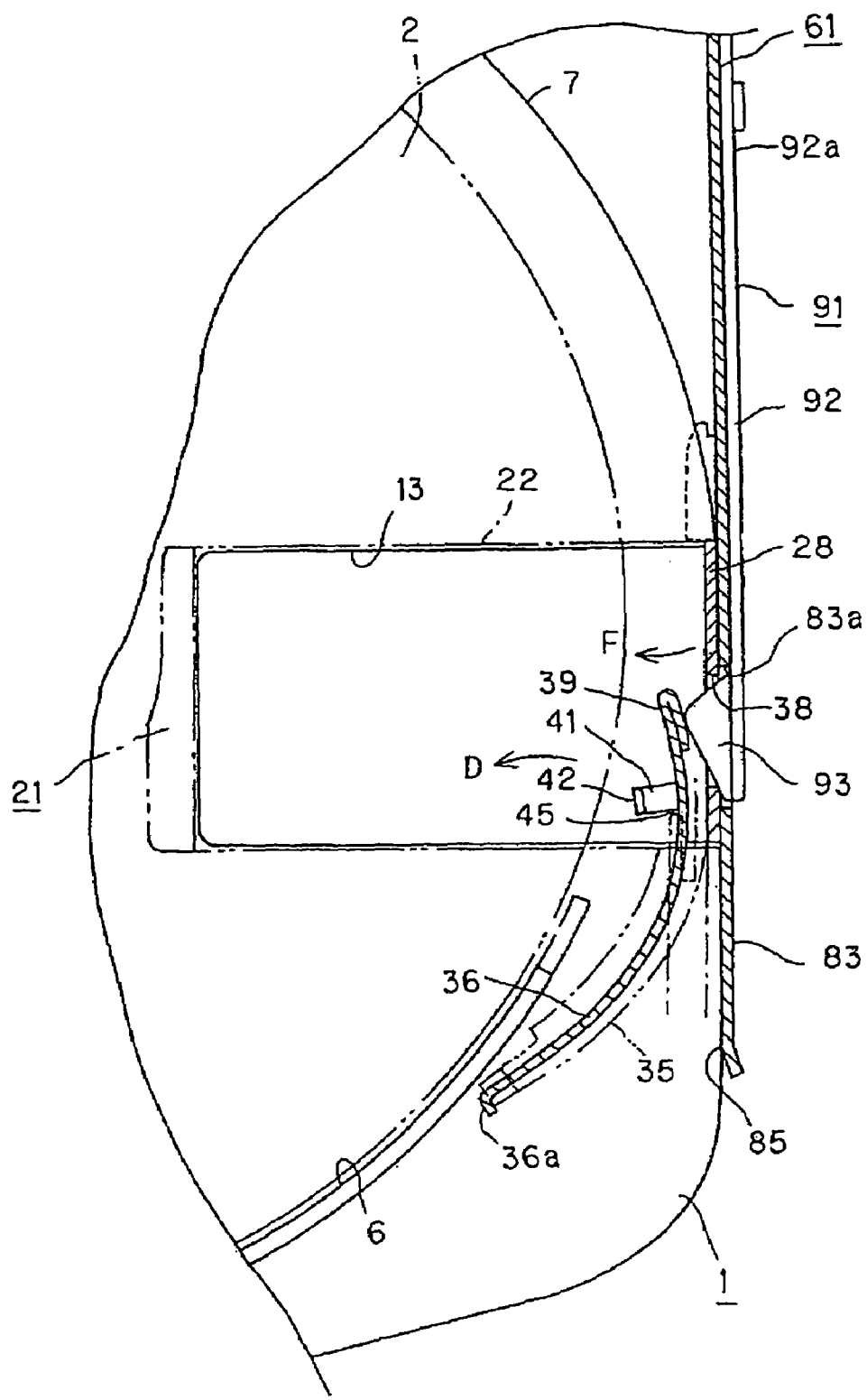
FIG. 13 is a plan view of the cartridge holder having the disk cartridge inserted therein with the shutter movement limiter pivoted by a shutter releasing mechanism and thus disengaged from a movement limiter.
Figure 14:
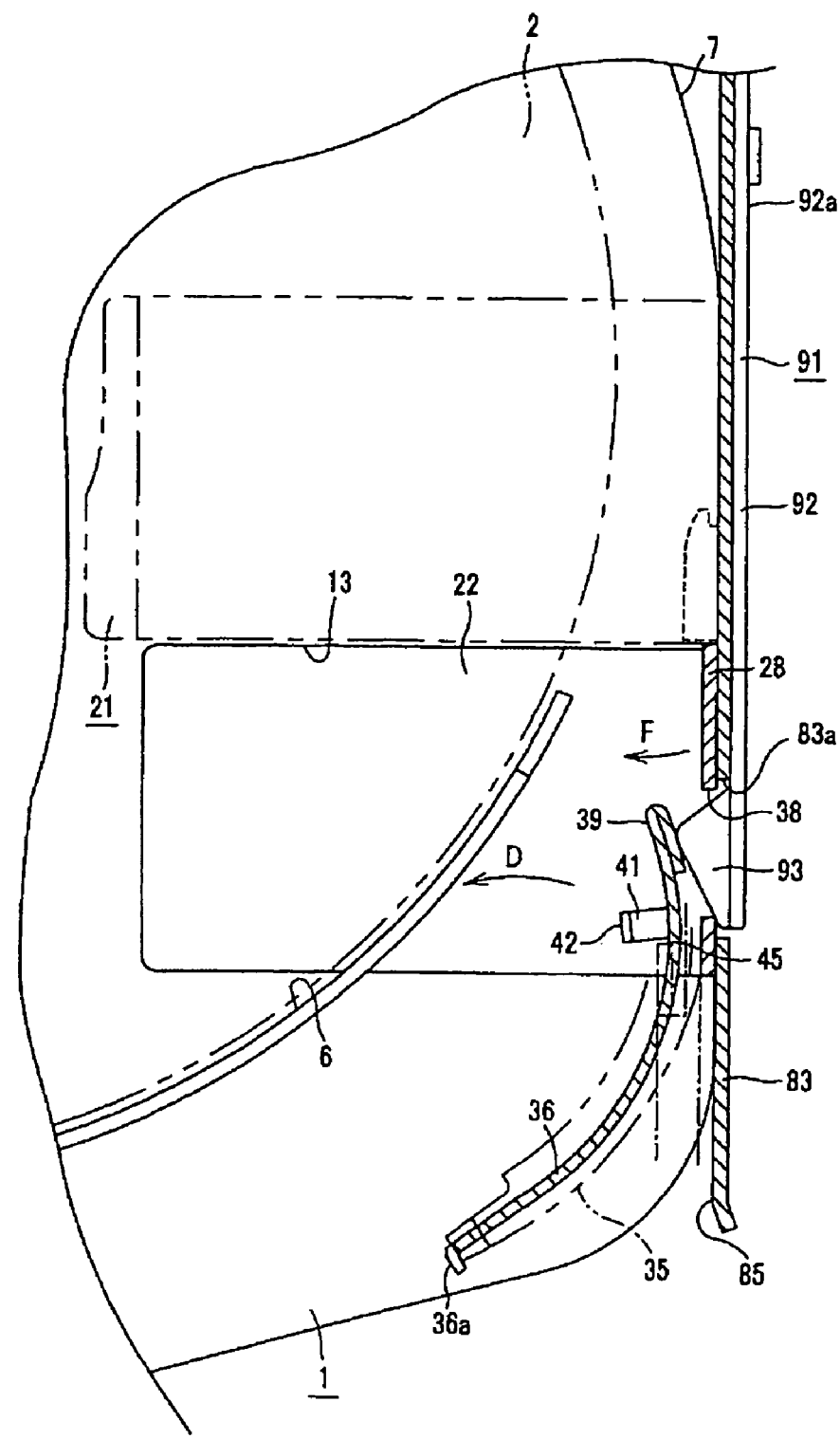
FIG. 14 is a plan view of the cartridge holder having the disk cartridge inserted therein with the head opening being uncovered.

The disk cartridge 1 is inserted deeper into the cartridge holder 81 in the direction of arrow G in FIG. 12 from the position shown in FIG. 12. When the shutter releaser 93 arrives at a position opposite to the window 38 formed in the movement guide piece 28, the leaf spring 92 having elastically been moved will be returned elastically in the direction of arrow F in FIG. 13 and the shutter releaser 93 at the free end of the leaf spring 92 will go into the window 38. The shutter releaser 93 having entered the window 38 will press the pressing portion 39 to elastically move the elastic moving piece 36 in the direction of arrow D in FIG. 13. When the elastic moving piece 36 is thus elastically moved in the direction of arrow D in FIG. 13, the shutter movement limiter 41 will be pivoted in the same direction and the engaging portion 42 will go out of the position opposite to the movement limiter 45. As the result, the shutter member 21 is liberated by the movement limiter 45 at the cartridge body 5 from the position where it is limited from moving. At this time, in the shutter member 21, the shutter releaser 93 will be engaged in the window 38. As the disk cartridge 1 is inserted deeper in the cartridge holder 81 from the above position, the cartridge body 5 will be moved relatively to the shutter member 21 to uncover the head opening 13 as shown in FIG. 13. Then, when the disk cartridge 1 has inserted to a predetermined position in the cartridge holder 81, the head opening 13 will be uncovered to the full extent as shown in FIGS. 10 and 14.

Note here that since the shutter releaser 93 is kept engaged in the window 38 while the disk cartridge 1 is left inserted in the cartridge holder 81, the shutter member 21 is held in the position to uncover the head opening 13.

Thus, the cartridge holder 81 is pivoted to the cartridge mount 76, and so the disk cartridge 1 inserted in the cartridge holder 81 with the head opening 13 being uncovered is mounted in place on the cartridge mount 76.

With the disk cartridge 1 being mounted on the cartridge mount 76, the optical disk 2 encased in the disk cartridge 1 is mounted on the turn table 74 and becomes rotatable by the disk rotation driving mechanism 73. At this time, the optical head 75 faces the optical disk 2 through the uncovered head opening 13. In this state, the disk rotation driving mechanism 73 is driven to put the optical head 75 into action to read information signal recorded in the optical disk 2.

To eject the disk cartridge 1 from on the cartridge mount 76, the operation of reading the optical disk 2 is stopped, an ejecting mechanism provided at the disk recorder and/or player is put into operation and the cartridge holder 81 is pivoted to a position separated from the cartridge mount 76 and higher than the base 72. Then, the rear side of the disk cartridge 1 is projected from the cartridge slot 85. When the disk cartridge 1 is drawn out of the cartridge holder 81 by holding the portion thereof projecting from the cartridge slot 85, the cartridge body 5 is moved relatively to the shutter member 21 held by the shutter releasing mechanism 91 in the direction of arrow H in FIG. 14 and the shutter member 21 is moved to the position to cover the head opening 13. When the disk cartridge 1 is further drawn out of the cartridge holder 81, the shutter releaser 93 will leave the window 38 and the pressure to the pressing portion 39 will be removed. When the pressure is removed from the pressing portion 39, the elastic moving piece 36 will elastically be returned to its initial position owing to its own force. The shutter movement limiter 41 will be pivoted along with the elastic moving piece 36 to make the engaging portion 42 abut on the movement limiter 45 provided at the cartridge body 5, to thereby limit the shutter member 21 from moving and thus keep the head opening 13 covered with the shutter 22 as shown in FIG. 12.

Since the shutter releasing mechanism 91 has a simplified structure in which the shutter releaser 93 is provided at one end of the leaf spring 92, the disk recorder and/or player using the disk cartridge 1 according to the present invention itself can be designed simpler and smaller.

The aforementioned disk cartridge 1 has provided thereon integrally with the elastic moving piece 36 the shutter movement limiter 41 that limits the shutter member 21, positioned to cover the head opening 13, from moving in the direction of uncovering the head opening 13. However, the shutter movement limiter 41 may be provided on the shutter member 21 independently of the elastic moving piece 36.

On this account, there is provided on the shutter member 21 a shutter movement limiting member 101 having provided thereon a shutter movement limiter to limit the shutter member 21 positioned to cover the head opening 13 from moving in the direction of uncovering the head opening 13. This is a second embodiment of the disc cartridge according to the present invention. The disk cartridge will be described in detail below with reference to FIGS. 15 and 16.

The disk cartridge is generally indicated with a reference numeral 100. It should be noted that the same elements of the disk cartridge 100 as those of the aforementioned disk cartridge 1 will be indicated with the same reference numerals as those used in the illustration and description of the elements of the disk cartridge 1 and will not be described in detail any longer.

Figure 15:
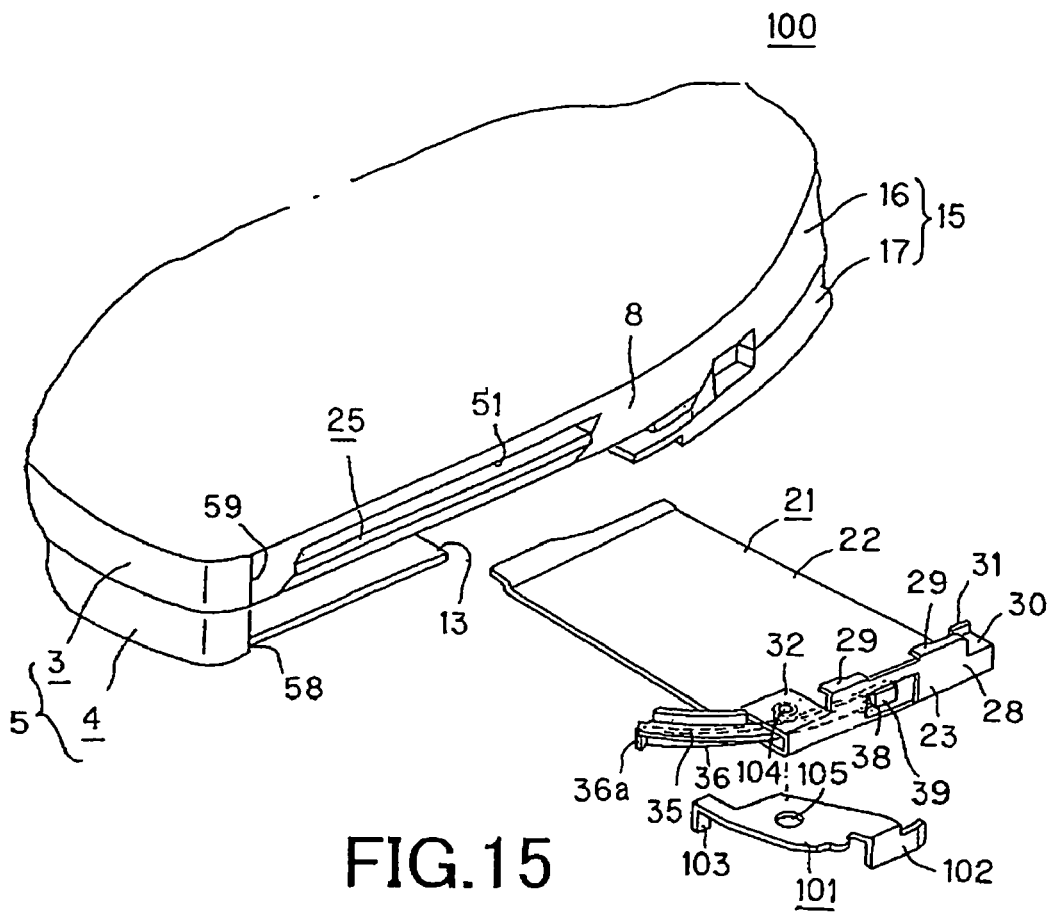
FIG. 15 is a perspective view of a shutter member and cartridge body having the shutter member installed thereon in a second embodiment of the disk cartridge according to the present invention.
Figure 16:
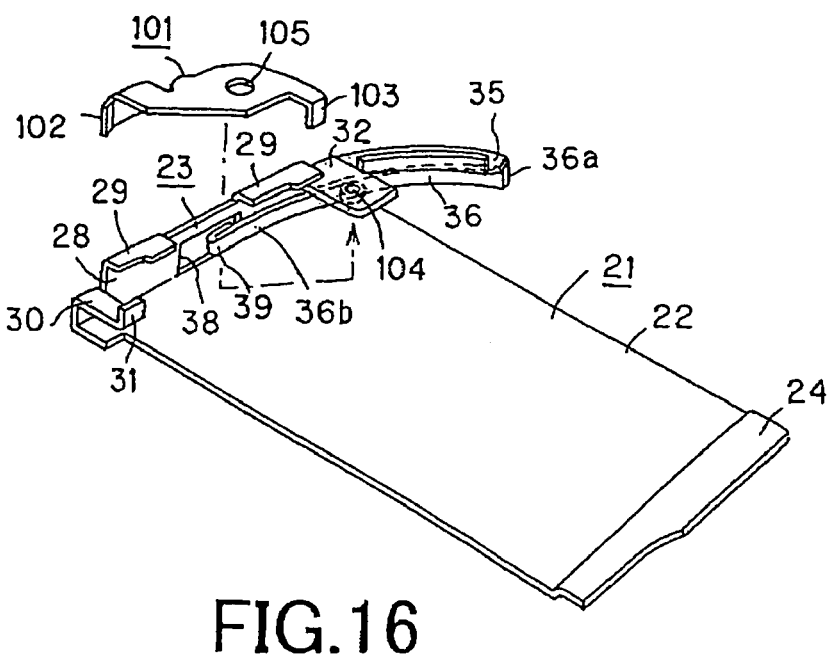
FIG. 16 is a perspective view of a shutter member having installed thereon a shutter movement limiting member that is pressed by an elastic moving piece.

As shown in FIGS. 14 and 15, the shutter movement limiting member 101 used in the disk cartridge 100 as the second embodiment of the present invention is formed by punching and bending a thin metal sheet, and has provided at one and the other ends thereof a pressing portion 102 and a engaging portion 103, respectively. The pressing portion 102 is formed by bending one end portion of the shutter movement limiting member 101 nearly perpendicularly to the latter. When the cartridge disk 100 according to the present invention is loaded into the disk recorder and/or player, the pressing portion 102 is pressed by a shutter releaser as a part of the shutter releasing mechanism provided at the disk recorder and/or player.

Note that in this disk cartridge 100 as the second embodiment of the present invention, the pressing portion 102 provided at the free end of the elastic moving piece 36 presses the shutter movement limiting member 101.

Also, the engaging portion 103 is formed by bending the other end portion of the shutter movement limiting member 101 nearly perpendicularly to the latter. As will be described in detail later, the engaging portion 103 provides a shutter movement limiter that engages on an engaging portion provided at the cartridge body 5, when the shutter member 21 is installed to the cartridge body 5, to limit the shutter member 21 positioned to cover the head opening 13 from moving in the direction of uncovering the head opening 13.

Figure 17:
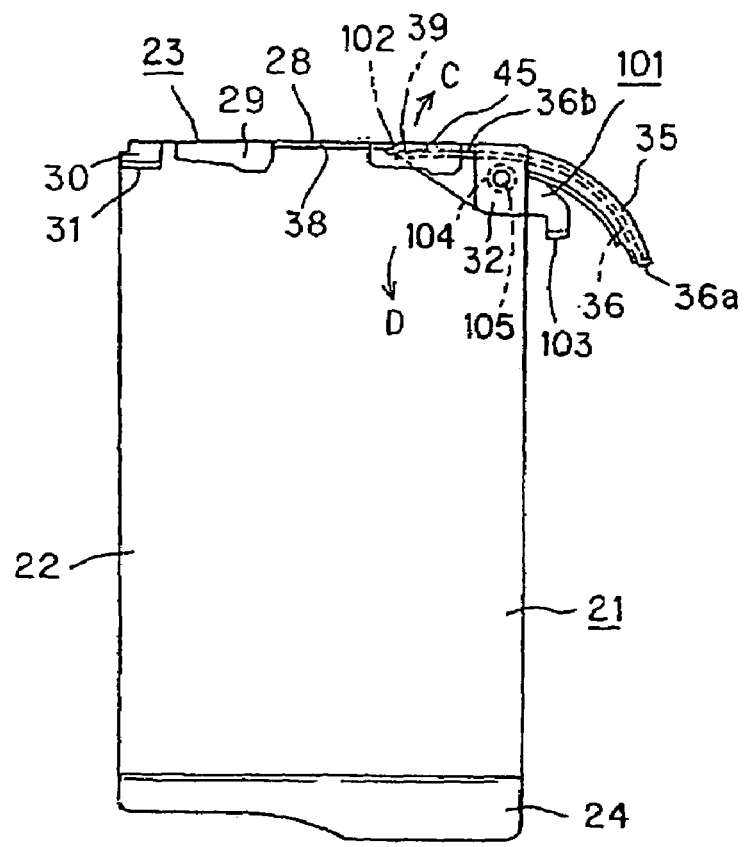
FIG. 17 is a plan view of the shutter member having the shutter movement limiting member installed therein.
Figure 18:
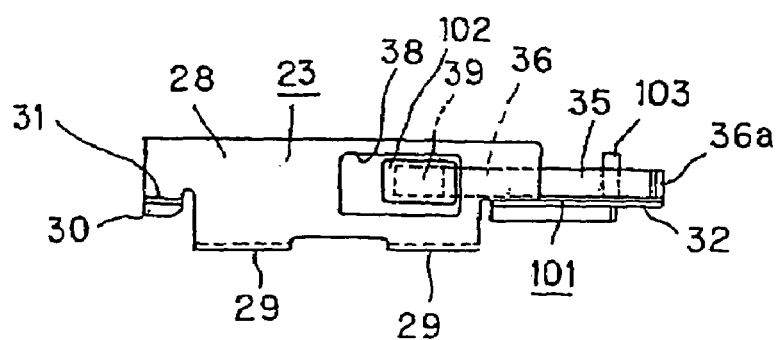
FIG. 18 is a front view, from a movement guide piece, of the shutter member having the shutter movement limiting member installed thereon.

As shown in FIGS. 17 and 18, when the shutter member 21 is installed to the cartridge body 5, the shutter movement limiting member 101 is installed to the bent portion 32 with the pressing portion 102 being positioned to face the window 38 formed in the movement guide piece 28 opposite to the one lateral side 8 of the cartridge body 5. At this time, the engaging portion 103 provided at the other end of the shutter movement limiting member 101 is positioned to project from the other side where the bent portion 32 of the shutter member 21 is provided.

Also, the shutter movement limiting member 101 is installed to the bent piece 32 to be pivotable about the a cylindrical projection 104 formed by burring at the center of the bent piece 32 by penetrating the projection 104 through a through-hole 105 formed in the center of the shutter movement limiting member 101 and crushing to rivet the free end of the projection 104.

When the pressing portion 102 is positioned between the movement guide piece 28 and elastic moving piece 36 and installed to the bent piece 32, the pressing portion 102 will be pressed at the back thereof by the elastic moving piece 36 and the shutter movement limiting member 101 be pivoted in the direction of arrow C in FIG. 17 in which the pressing portion 102 will project from the window 38. As the pressing portion 102 is pressed against the force of the elastic moving piece 36, the shutter movement limiting member 101 will be pivoted about the projection 104 in the direction of arrow D in FIG. 17.

Note that the shutter movement limiting member 101 is pressed by the pressing portion 102 as the shutter releaser of the shutter releasing mechanism 91 provided at the cartridge holder goes into the window 38 when the disk cartridge 100 according to the present invention is inserted into the cartridge holder of the disk recorder and/or player using the disk cartridge 100 as a recording medium.

Figure 19:
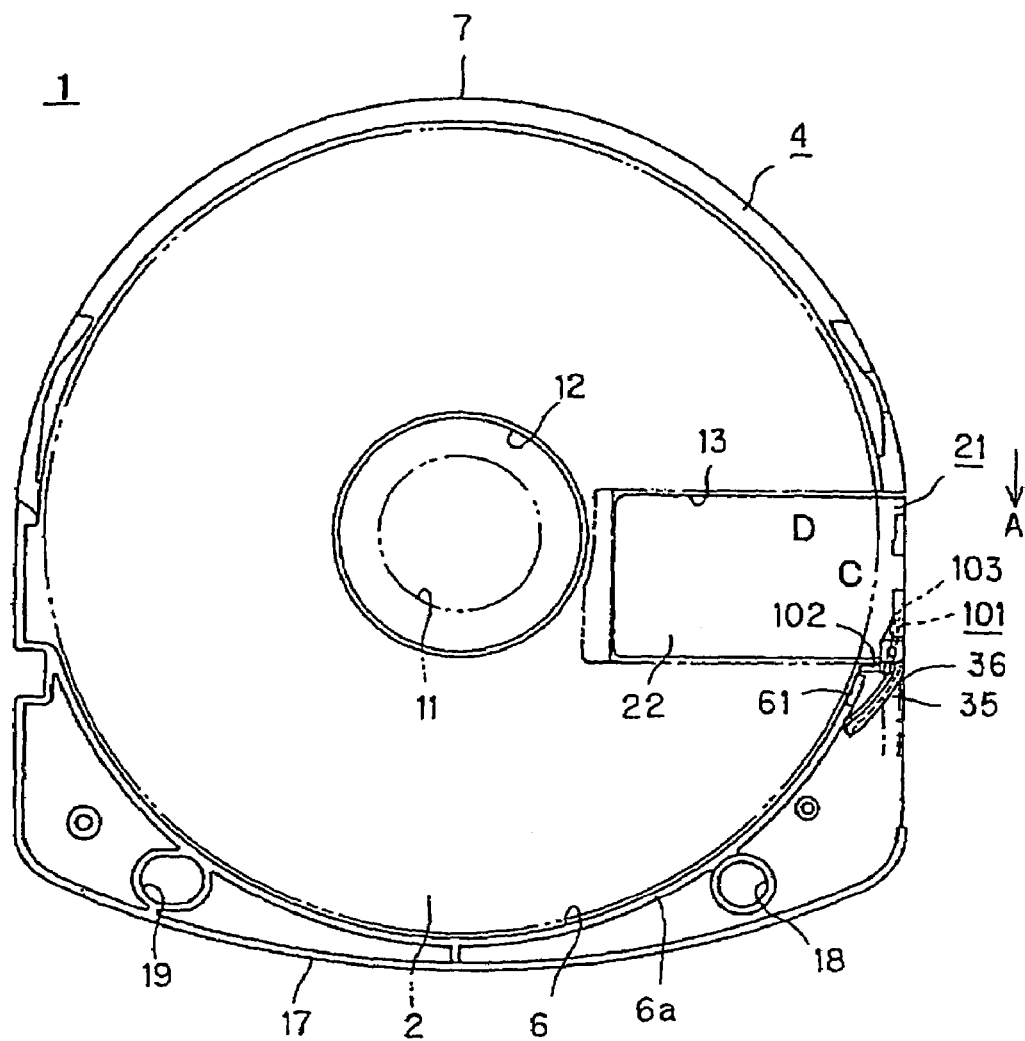
FIG. 19 is a plan view, from inside the lower half, of a head opening covered by the shutter member.

When the shutter member 21 has been moved to the position to cover the head opening 13, the engaging portion 103 on the shutter movement limiter 101 provided pivotably on the shutter member 21 will be opposite to a movement limiter 61 provided at the cartridge body 5 as shown in FIG. 19. When the shutter member 21 is going to move in the direction of arrow A in FIG. 19 to uncover the head opening 13, the engaging portion 103 will abut on the movement limiter 61 provided at the cartridge body 5 to limit the shutter member 21 from moving and keep the head opening 13 covered with the shutter 22.

Note that the movement limiter 61 is formed from a projection formed on the inner surface of the lower half 4 as shown in FIG. 19. According to this embodiment, the movement limited 61 is formed contiguous to one end, facing the head opening 13, of the circular peripheral wall 6a of the disk receptacle 6.

Figure 20:
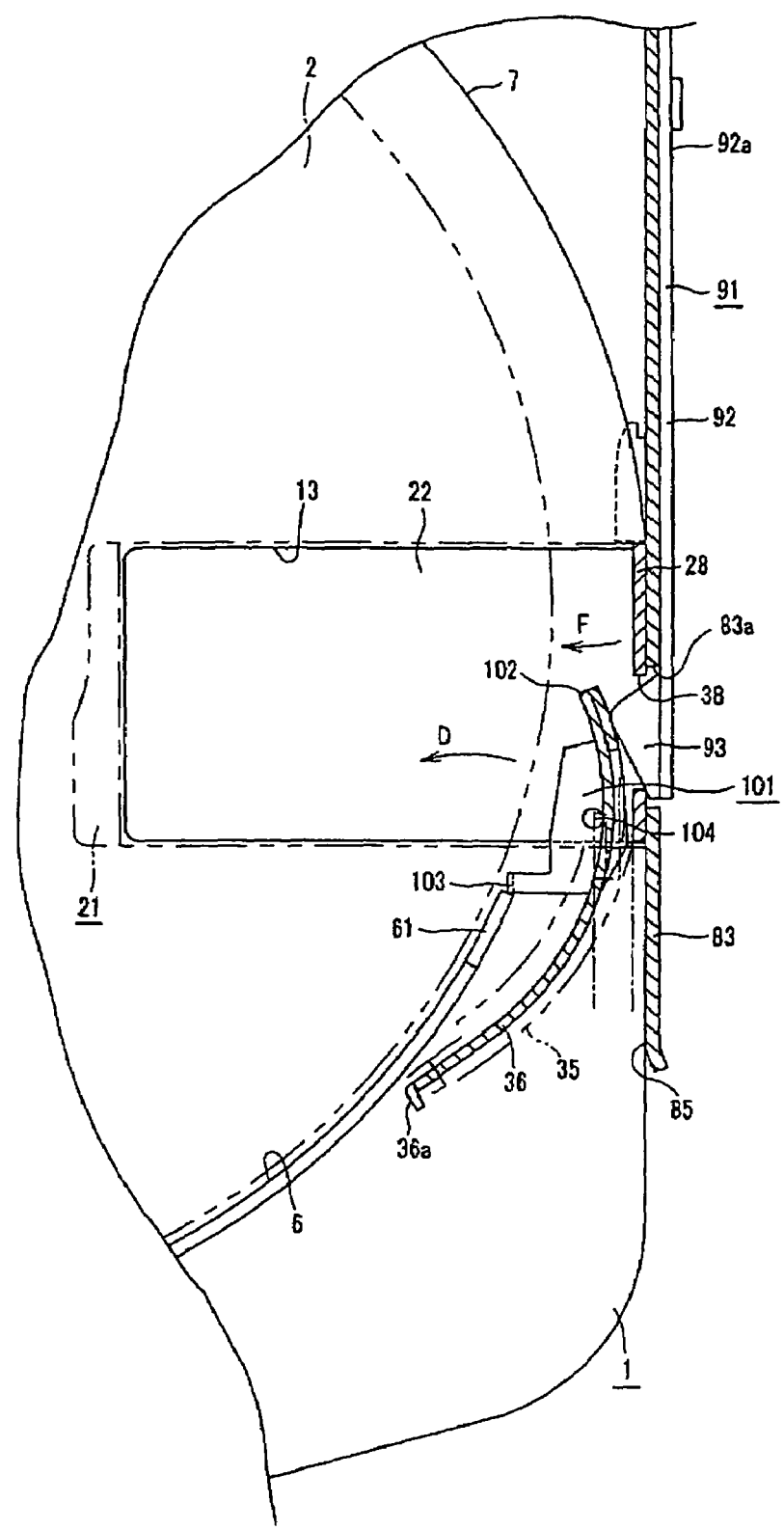
FIG. 20 is a plan view of the shutter movement limiting member pivoted by a shutter releasing mechanism and disengaged from a movement limiter.

To uncover the head opening 13 by moving the shutter 21 staying in the position to cover the head opening 13 and limited from moving, the shutter releaser of the shutter releasing mechanism provided at the cartridge holder 81 of the disk recorder and/or player is moved into the window 38 to press the pressing portion 102 and pivot the engaging portion 103 in the direction of arrow D in FIGS. 19 and 20. When the shutter movement limiting member 101 is pivoted in the direction of arrow D in FIG. 20, the engaging portion 103 is moved toward the one lateral side 8 of the cartridge body 5 and disengaged not being opposite to the movement limiter 61. As the result, the shutter member 21 is liberated by the movement limiter 61 from the position where it is limited from moving and becomes movable in the direction of arrow A in FIG. 20 to uncover the head opening 13.

Figure 21:
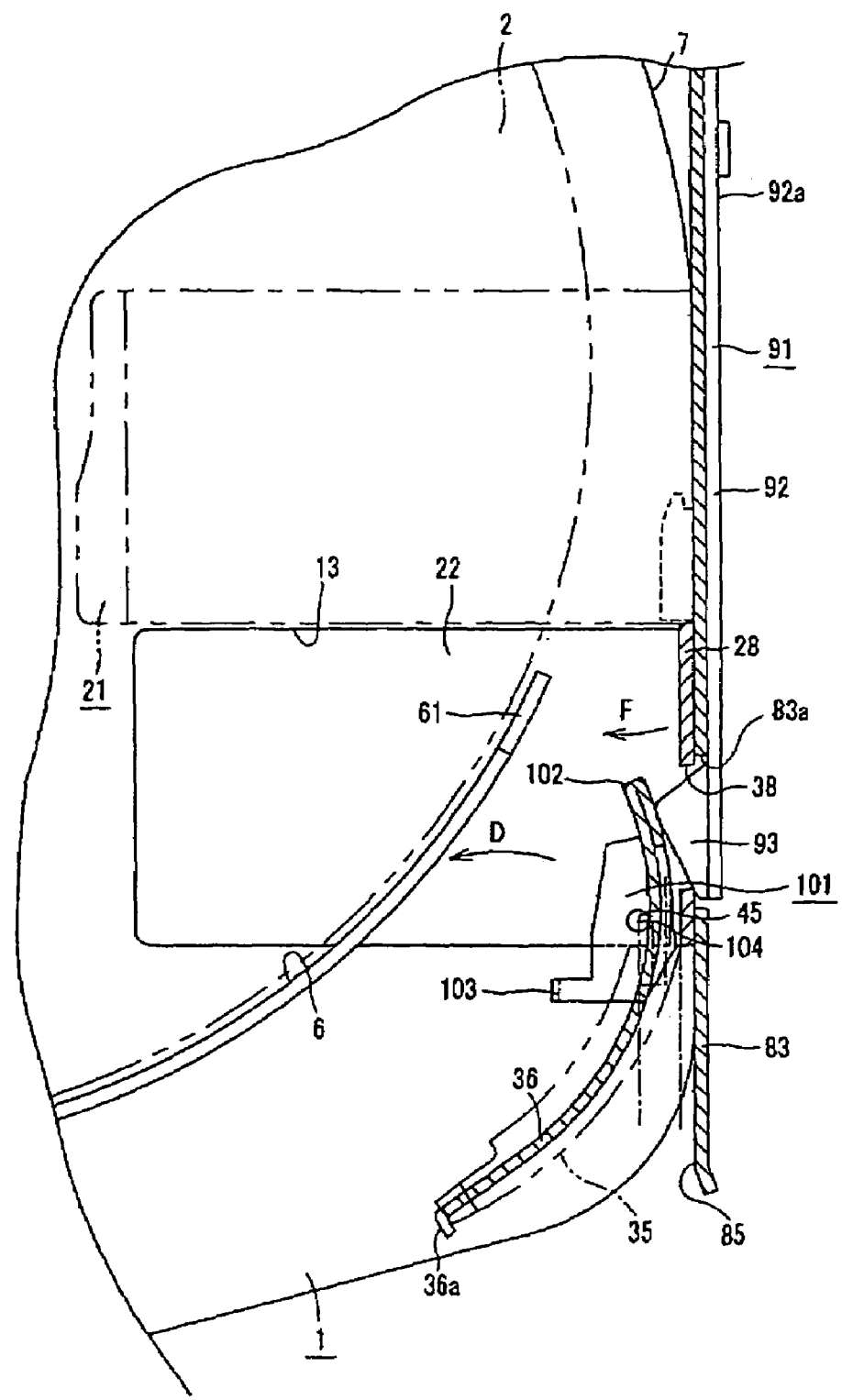
FIG. 21 is a plan view of the shutter movement limiting member disengaged from the movement limiter and the head opening uncovered by the shutter member moved.
Figure 22:
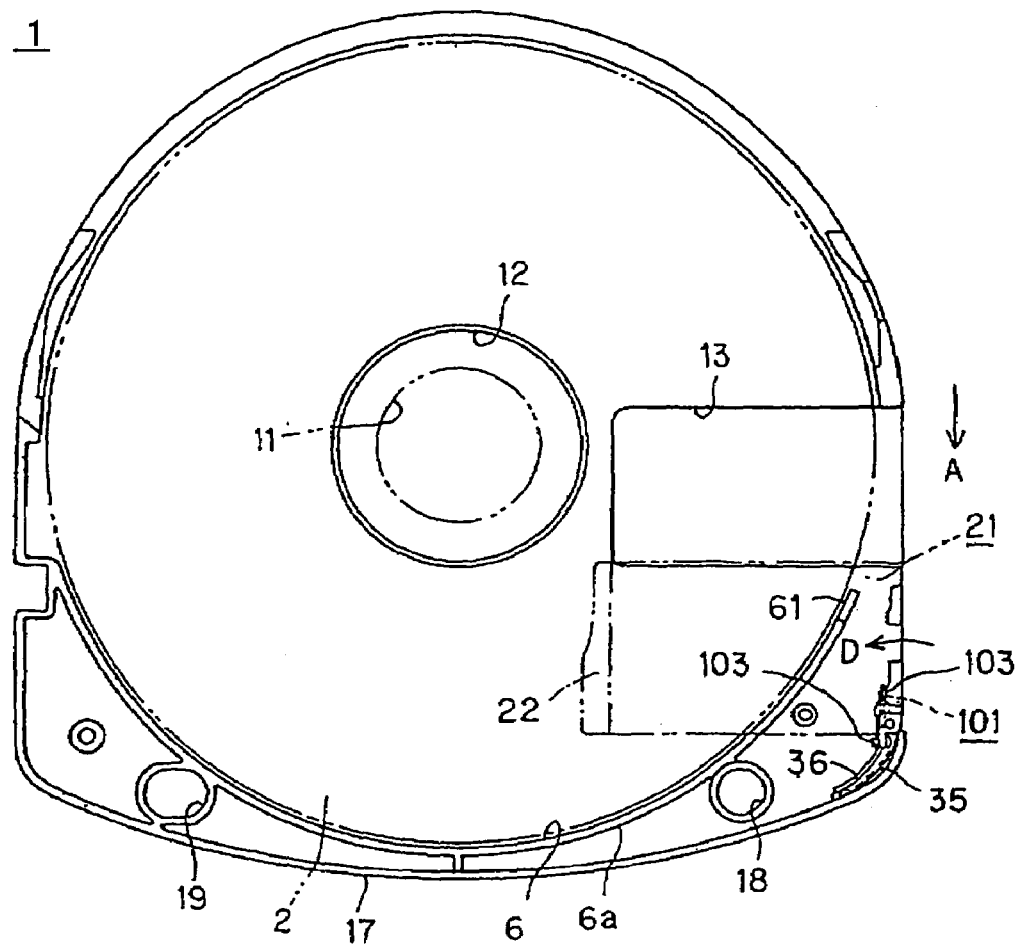
FIG. 22 is a plan view, from inside the lower half, of the shutter member moved to a position to uncover the head opening.

When the disk cartridge 1 is inserted deeper in the cartridge holder 81 from the position shown in FIG. 20, the cartridge body 5 is moved relatively to the shutter member 21 and the head opening 13 is uncovered. When the disk cartridge 1 has been inserted to a predetermined position in the cartridge holder 81, the head opening 13 is uncovered to the full extent as shown in FIGS. 21 and 22.

To eject the disk cartridge 1 from on the cartridge mount 76 of the disk recorder and/or player constructed as shown in FIG. 11, the operation of reading the optical disk 2 is stopped, the ejecting mechanism provided at the disk recorder and/or player is put into operation and the cartridge holder 81 is pivoted to a position separated from the cartridge mount 76 and higher than the base 72 as having previously been described. Then, the rear side of the disk cartridge 1 is projected from the cartridge slot 85. When the disk cartridge 1 is drawn out of the cartridge holder 81 by holding the portion thereof projecting from the cartridge slot 85, the cartridge body 5 is moved relatively to the shutter member 21 held by the shutter releasing mechanism 91 in the direction of arrow H in FIG. 22 and the shutter member 21 is moved to the position to cover the head opening 13. When the disk cartridge 1 is further drawn out of the cartridge holder 81, the shutter releaser 93 will leave the window 38 and the pressure to the pressing portion 102 will be removed. When the pressure is removed from the pressing portion 102, the shutter movement limiting member 101 is applied with the force of the elastic moving piece 36 that presses the back of the pressing portion 302 and thus pivoted about the through-hole 105 formed in the projection 104 in the direction of arrow C in FIGS. 17 and 19. As the shutter movement limiting member 101 is pivoted, the engaging portion 103 abuts on the movement limiter 61 provided at the cartridge body 5 to limit the shutter member 21 from moving and thus keep the head opening 13 covered with the shutter 22 as shown in FIG. 19.

Note here that before ejecting the disk cartridge 1 from on the cartridge holder 81, the shutter movement limiting member 101 is being pressed by the shutter releaser 93 of the shutter releasing mechanism 91 provided on the cartridge holder 81 and the engaging portion 103 is separate from the movement limiter 61 at the cartridge body 5. That is, the engaging portion 103 is kept separate from the movement limiter 61 until the engaging portion 103 moving the shutter member 21 to the position to cover the head opening 13 has passed by the movement limiter 61. When the cartridge body 5 is further drawn out of the cartridge holder 81 after the engaging portion 103 passes by the movement limiter 61 and the shutter member 21 is moved to the position to cover the head opening 13, the pressing of the shutter movement limiting member 101 by the shutter releasing mechanism 91 is canceled, the shutter movement limiting member 101 is pivoted in the direction of arrow C in FIGS. 17 and 19, and the engaging portion 103 abuts on the movement limiter 61 provided at the cartridge body 5 to limit the shutter member 21 from moving.

In the disk cartridge 100 according to this embodiment, since the shutter member 21 staying in the position to cover the head opening 13 is limited from moving in the direction of uncovering the head opening 13, the optical disk encased in the cartridge body 5 can be protected positively.

Note here that there is also available a small disk cartridge having a small disk encased therein and they should be designed simpler for easier production and lower manufacturing cost.

Here will be illustrated and described a disk cartridge as a third embodiment of the present invention. This disk cartridge has no shutter member provided thereon but has the head opening left uncovered, and it is compatible with a disk recorder and/or player including the cartridge mount on which the aforementioned disk cartridge 1 with the shutter member 21 is mounted.

The disk cartridge as the third embodiment of the present invention, having no shutter member, is generally indicated with a reference numeral 201. This disk cartridge 201 has the same profile as the aforementioned disk cartridge 1. Also, the basic elements of the disk cartridge 201 are the same as those of the disk cartridge 1. They will be indicated with the same reference numerals as those used in the illustration and description of the disk cartridge 1, and will not be described in detail any longer.

Figure 23:
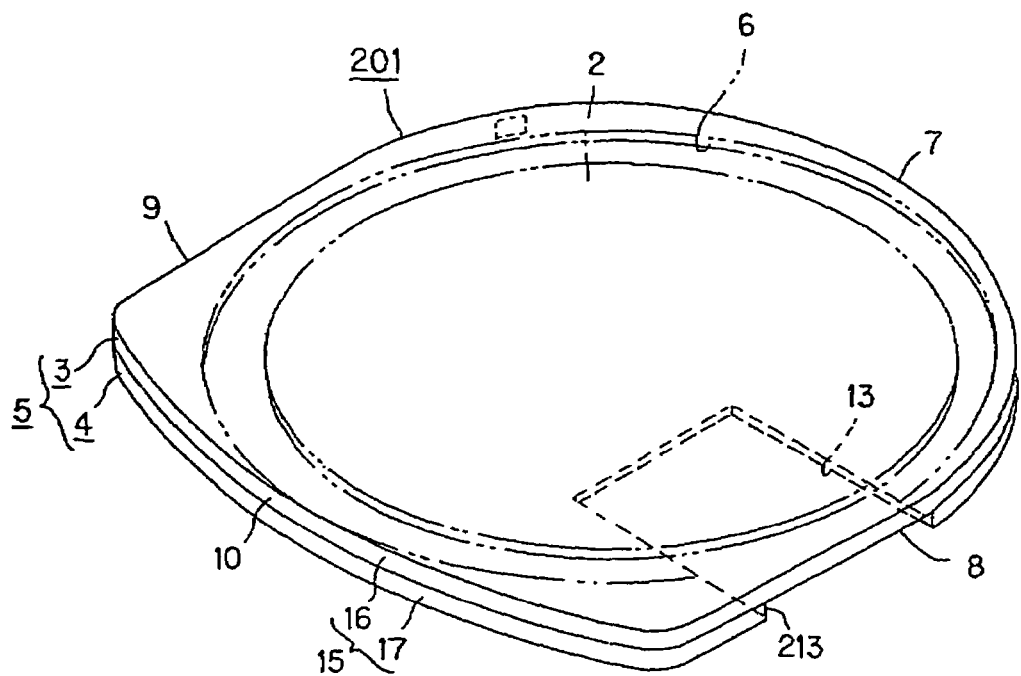
FIG. 23 is a perspective view, from the upper half, of a third embodiment of the disk cartridge according to the present invention.
Figure 24:
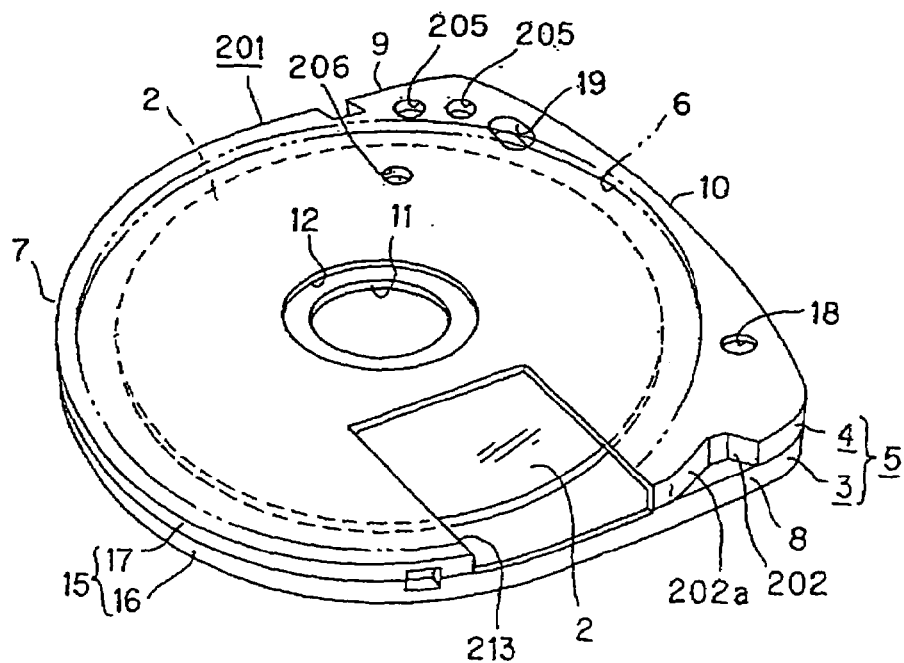
FIG. 24 is a perspective view, from the lower half, of the disk cartridge as the third embodiment of the present invention.

As shown in FIGS. 23 and 24, the disk cartridge 201 having no shutter member includes the cartridge body 5 formed from the pair of upper and lower halves 3 and 4 butt-joined to each other, and has an optical disk 2 encased therein.

As shown in FIGS. 23 and 24, the cartridge body 5 included in the disk cartridge 201 has the front side 7 thereof formed circular. The disk cartridge 201 is inserted first at the front side 7 into the disk recorder and/or player.

The lateral sides 8 and 9 of the cartridge body 5 contiguous to the circular front side 7 and opposite to each other are parallel to each other, and the rear side 10 opposite to the circular front side 7 is gently curved. That is, the rear side 10 of the cartridge body 5 is larger in radius, namely, smaller in curvature, than the semi-circular front side 7.

Also in this disk cartridge 201, there is formed in the center of the lower half 4 that forms the lower side of the cartridge body 5 a circular disk drive opening 12 through which the central hole 11 formed in the center of the optical disk 2 encased in the cartridge body 5 and its perimeter are exposed to outside as shown in FIG. 24.

Also, in the lower half 4, there is formed a head opening 213 that is a write and/or read opening as shown in FIG. 24. The head opening 213 is located at one (8) of the lateral sides of the cartridge body 5 and formed rectangular extending from a position near the disk drive opening 12 to the lateral side 8. More specifically, the rectangular form of the head opening 213 is large enough to expose, to outside, a part, ranging from the inner to outer radius, of the signal recording area of the optical disk 2 encased in the cartridge body 5. As shown in FIG. 24, the head opening 213 is open at one (8) of the lateral sides of the cartridge body 5. Also, since the head opening 213 is only extending to a position short of the disk drive opening 12, namely, since there remains a portion 14 between the head opening 213 and disk drive opening 12, the lower half 4 can maintain a mechanical strength.

Since the disk cartridge 201 according to this embodiment of the present invention is constructed without including any shutter member to cover and uncover the head opening 213, the outer surface of the lower half 4 that is also the bottom of the cartridge body 5 is also formed flat except its area where the drive opening 12 and head opening 213 are formed as shown in FIG. 24.

Figure 25:
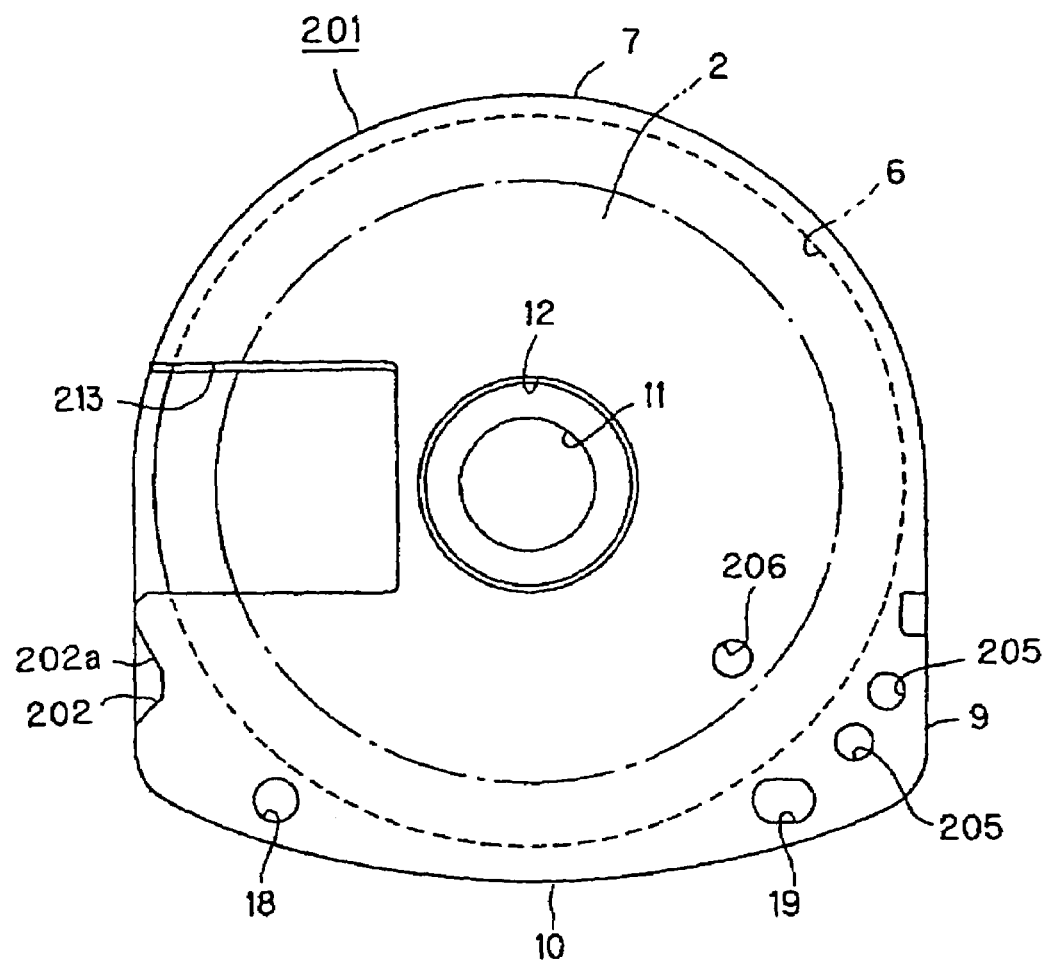
FIG. 25 is a plan view, from the lower half, of the disk cartridge as the third embodiment of the present invention.

Note here that the head opening 213 formed in the disk cartridge 201 according to this embodiment is larger than the head opening 13 formed in the aforementioned disk cartridge 1 as will be seen from FIGS. 24 and 25. On the assumption that a line is drawn to the middle of a line drawn between the circular foremost and rearmost sides of the cartridge body 5 through the center of the drive opening 12 and perpendicularly to the line thus drawn, the area of the head opening 213 in the disk cartridge 201, nearer to the circular front side, is larger than that nearer to the rear side. Thus, the optical head to scan, with a light beam, the signal recording area of the optical disk 2 encased in the disk cartridge 201 can be allowed to go deeper into the cartridge body 5 to a position nearer to the optical disk 2.

Since the optical head can thus be placed near to the optical disk 2, the latter can be scanned by an optical head using an objective lens whose numerical aperture (NA) is large. Therefore, data can be recorded to the optical disk 2 with a higher density and thus the disk recorder and/or player using this disk cartridge 101 can be formed thinner.

Since the disk cartridge 201 includes no shutter member, the one lateral side 8 of the cartridge body 5 at which th head opening 213 is open is formed flat and contiguous to the outer surface of the rising peripheral wall 15 except the portion where the head opening 213 is formed as shown in FIGS. 23 and 24. Also, since the disk cartridge 201 has the same profile as the disk cartridge 1 including the shutter member 21, when it is inserted into the cartridge holder 81, the one lateral side 8 of the cartridge body 5 will be pressed directly by the shutter releasing mechanism 91 provided on the cartridge holder 81 included in the cartridge mount provided at the disk recorder and/or player with which the disk cartridge 1 including the shutter member 21 is compatible. Further, also when the disk cartridge 201 is inserted into place in the cartridge holder 81, the one lateral side 8 of the cartridge body 5 will be kept pressed by the shutter releasing mechanism 91. That is, since the disk cartridge 201 has no shutter member, the shutter releasing mechanism 91 will press directly the cartridge body 5.

Figure 26:
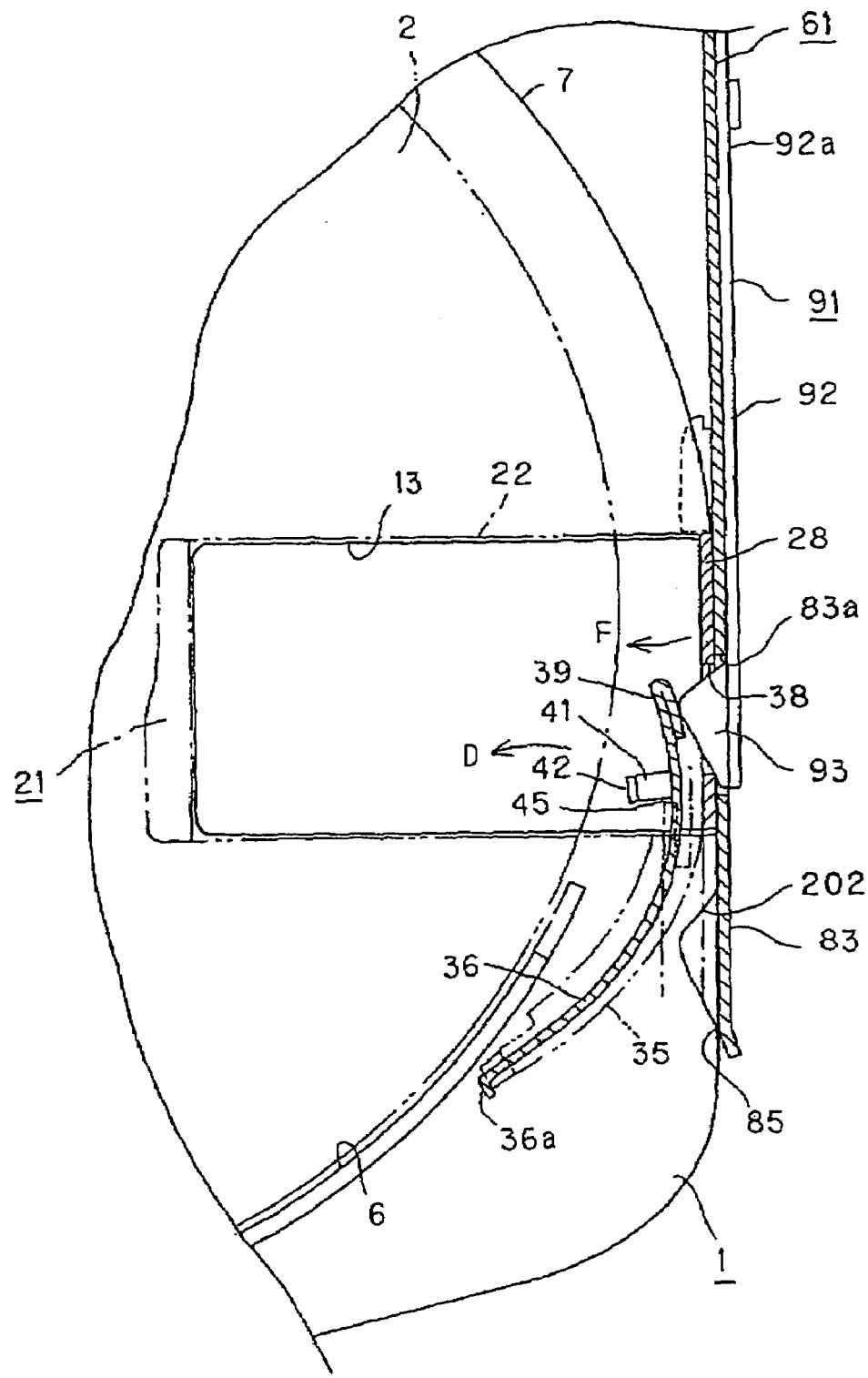
FIG. 26 is a plan view, from inside the lower half, of the disk cartridge as a fourth embodiment of the present invention, inserted in a cartridge holder of the recording and/or playback apparatus, having the shutter member moved to the position to uncover the head opening.

On this account, the disk cartridge 201 has provided thereon a pressure avoiding member 202 to avoid the pressure from the shutter releasing mechanism 91 when the disk cartridge 201 is inserted into the cartridge holder 81 into which the disk cartridge 1 including the shutter member 21 is to be inserted. As shown in FIG. 26, the pressure avoiding member 202 is provided in a position where it will be opposite to the shutter releaser 93 provided on the leaf spring 92 included in the shutter releasing mechanism 91 when the disk cartridge 201 is inserted into place in the cartridge holder 81.

The pressure avoiding member 202 is formed as a concavity in a portion of the one lateral side 8 of the lower half 4 of the cartridge body 5. Since the pressure avoiding member 202 is provided to avoid the pressure from the shutter releasing mechanism 91, the concavity is formed to have such a shape and depth that will prevent the shutter releaser 93 from touching the cartridge body 5.

That is, the pressure avoiding member 202 is formed as the concavity in order to prevent the shutter releaser 93 once engaged in the pressure avoiding member 202 from easily being disengaged. The shutter releaser 93 is engaged running on one of the concavity ends of the pressure avoiding member 202 while elastically moving the leaf spring 92 outwardly.

Note that the pressure avoiding member 202 has the side thereof, at which the shutter releaser 93 goes into the pressure avoiding member 202, formed as a gentle slope 202a for easier ingression of the shutter releaser 93.

Also, the pressure avoiding member 202 may be a notch formed by cutting a part of the rising peripheral wall 15 forming the one lateral side 8 of the cartridge body 5.

Also when the disk cartridge 201 is mounted on the cartridge mount on which the disk cartridge 1 including the shutter member 21 to cover and uncover the head opening 13 and a mechanism to hold the shutter member 21 in the covering position, it can stably be mounted without being applied with any pressure from the shutter releasing mechanism 91.

Also, the disk cartridge 201 has formed at the lower half 4 thereof a plurality of disk identification units 204, 205 and 206 for identifying the recording capacity and type of an encased optical disk 2. As shown in FIGS. 24 and 25, the disk identification units 204, 205 and 206 are formed also in an area defined by the disk receptacle 6 and bent portion 10 as well as in an area where the disk receptacle 6 is provided. In the area defined by the disk receptacle 6 and bent portion 10, each of the disk identification units 204 and 205 is a through-hole or bottomed concavity formed in a part of the lower half 4. In the disk receptacle 6, the disk identification unit 206 is formed as a bottom concavity. The purpose of the identification units so formed is to prevent dust or the like from entering the disk receptacle 6.

Since the disk identification unit 206 can be provided in the area where the disk receptacle 6 is provided, many disk identification units can be provided also in a smaller disk cartridge 201 to easily identify many types of disk cartridges having multiple types of optical disks encased therein respectively.

Note that the aforementioned disk identification units 204, 205 and 206 may be provided in the disk cartridge 1 as in the disk cartridge 201.

In the foregoing, the present invention has been described concerning the disk cartridges having read-only optical disks encased therein respectively. However, the present invention is also applicable to a disk cartridge having encased therein any other disk such as a writable optical disk with the same advantage as in the application of the present invention to the disk cartridges having been illustrated and described in the foregoing.

Also in the foregoing, the present invention has been described concerning the disk cartridges in which the cartridge body has the front side thereof formed circular. However, the present invention is not limited to the disk cartridge having such a cartridge body but it is also applicable to a conventional, widely used disk cartridge including a rectangular cartridge body.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A disk cartridge comprising:
a disk;
a cartridge body having the disk encased rotatably therein and having formed therein a write and/or read opening through which a part of the disk, ranging from the inner to outer radius, is exposed to outside;
a shutter member including a shutter that covers and uncovers the write and/or read opening and a movement guide piece opposite to one side of the cartridge body, and installed to the cartridge body to be movable between a position to cover the write and/or read opening and a position to uncover the write and/or read opening;
a pressing portion installed to the shutter member to face a window formed in the movement guide piece opposite to the one side of the cartridge body;
a coupling arm extending from one side of the shutter member;
an elastic moving piece installed to the shutter member to force the pressing portion to outside of the cartridge body;
said elastic moving piece extending along the coupling arm, the elastic moving piece being located in a plane offset from a plane of the coupling arm, and
a shutter movement limiter provided on the shutter member and that is engaged on a movement limiter provided on the cartridge body, when the shutter member is in a position to cover the write and/or read opening, to limit the shutter member from moving in a direction of uncovering the write and/or read opening, and moves in a direction in which it is disengaged from the movement limiter when the pressing portion is pressed inwardly of the cartridge body.

2. The disk cartridge according to claim 1, further comprising
the elastic moving piece having a base end thereof fixed to the free end of the coupling arm; and
the pressing portion being installed to the free end of the elastic moving piece.

3. The disk cartridge according to claim 1, wherein the shutter movement limiter is provided integrally on the elastic moving piece.

4. The disk cartridge according to claim 1, wherein the pressing portion extends from the shutter member in the direction of uncovering the write and/or read opening in the shutter member.

5. The disk cartridge according to claim 1, wherein:
the shutter movement limiter is provided on a shutter movement limiting member provided rotatably on the shutter member; and
when the shutter member is in the position to cover the write and/or read opening, the shutter movement limiter provided on the shutter movement limiting member is engaged on the movement limiter provided on the cartridge body and limits the movement of the shutter member in the direction of uncovering the write and/or read opening, the pressing portion provided on the shutter movement limiting member is pressed inwardly of the cartridge body, and the shutter movement limiting member is pivoted outwardly of the cartridge body to disengage the shutter member from the movement limiter.

6. The disk cartridge according to claim 1, wherein the movement limiter is one end of a circular peripheral wall defining a receptacle for the disk.

7. The disk cartridge according to claim 1, wherein the shutter movement limiter moves in relation to the cartridge body in a direction in which the shutter member covers the write and/or read opening, and when it has passed by the movement limiter, it is elastically returned to its initial position and engaged on the movement limiter provided on the cartridge body to limit the shutter member from moving in the direction of uncovering the write and/or read opening.

8. A disk recording and/or playback apparatus comprising:
a cartridge holder into which there is removably inserted a disk cartridge including:
a disk;
a cartridge body having the disk rotatably encased therein and having formed therein a write and/or read opening through which a part of the disk, ranging from the inner to outer radius, is exposed to outside;
a shutter member including a shutter that covers and uncovers the write and/or read opening, and installed to the cartridge body to be movable between a position to cover the write and/or read opening and a position to uncover the write and/or read opening;
a pressing portion installed to the shutter member to face a window formed in a movement guide piece provided opposite to the one side of the cartridge body;

a coupling arm extending from one side of the shutter member;

an elastic moving piece installed to the shutter member to force the pressing portion to outside of the cartridge body;

said elastic moving piece extending along the coupling arm, the elastic moving piece being located in a plane offset from a plane of the coupling arm, and a shutter movement limiter provided on the shutter member and that is engaged on a movement limiter provided on the cartridge body, when the shutter member is in a position to cover the write and/or read opening, to limit the shutter member from moving in a direction of uncovering the write and/or read opening, and moves in a direction in which it is disengaged from the movement limiter when the pressing portion is pressed inwardly of the cartridge body, the cartridge holder including a shutter releasing mechanism that disengages the shutter movement limiter from the movement limiter by moving the elastic moving piece against the force of the latter inwardly of the cartridge body when the disk cartridge is inserted into the cartridge holder and moves the shutter member in a direction of uncovering the write and/or read opening.

9. A disk cartridge comprising:

a disk;

a cartridge body having the disk rotatably encased therein and having formed therein a write and/or read opening through which a part of the disk, ranging from the inner to outer radius, is exposed to outside;

a shutter member including a shutter that covers and uncovers the write and/or read opening, and installed to the cartridge body to be movable between a position to cover the write and/or read opening and a position to uncover the write and/or read opening;

a coupling arm extending from one side of the shutter member;

an elastic moving piece installed to the free end of the shutter member to extend along the coupling arm with the base end thereof being fixed to the free end of the coupling arm, including a pressing portion provided at the base end of the shutter to face a window formed in a movement guide piece provided opposite to the one side of the cartridge body, and forced to project the pressing portion to outside of the cartridge body; and a shutter movement limiter provided at the middle of the elastic moving piece and that is engaged on a movement limiter provided on the cartridge body, when the shutter member is in a position to cover the write and/or read opening, to limit the shutter member from moving in a direction of uncovering the write and/or read opening, and pivots along with the elastic moving piece in a direction in which it is disengaged from the movement limiter when the elastic moving piece is pressed against its own force by the pressing portion, the disk cartridge being removably placed on a cartridge mount, the disk cartridge including a pressure avoiding member provided in the cartridge body to position the pressing portion that presses the elastic moving piece of a shutter releasing mechanism, when the disk cartridge is mounted on the cartridge mount, to disengage the shutter movement limiter from the movement limiter by pivoting the elastic moving piece against the force of the latter and avoid pressing of the cartridge body by the shutter releasing mechanism.

\* \* \* \* \*